US012277885B2

(12) United States Patent
Kim et al.

(10) Patent No.: US 12,277,885 B2
(45) Date of Patent: Apr. 15, 2025

(54) GATE DRIVER AND DISPLAY DEVICE INCLUDING THE SAME

(71) Applicant: Samsung Display Co., LTD., Yongin-si (KR)

(72) Inventors: Kyungho Kim, Yongin-si (KR); Gichang Lee, Yongin-si (KR)

(73) Assignee: SAMSUNG DISPLAY CO., LTD., Gyeonggi-do (KR)

( * ) Notice: Subject to any disclaimer, the term of this patent is extended or adjusted under 35 U.S.C. 154(b) by 0 days.

(21) Appl. No.: 18/591,991

(22) Filed: Feb. 29, 2024

(65) Prior Publication Data

US 2024/0386825 A1 Nov. 21, 2024

(30) Foreign Application Priority Data

May 17, 2023 (KR) ........................ 10-2023-0063828

(51) Int. Cl.
*G09G 3/20* (2006.01)

(52) U.S. Cl.
CPC ....... *G09G 3/20* (2013.01); *G09G 2300/0819* (2013.01); *G09G 2300/0852* (2013.01); *G09G 2310/0267* (2013.01); *G09G 2330/021* (2013.01)

(58) Field of Classification Search
CPC ..... G09G 3/3266; G09G 3/3674–3681; G09G 3/20; G09G 2300/0819; G09G 2300/0852; G09G 2310/0267; G09G 2330/021
See application file for complete search history.

(56) References Cited

U.S. PATENT DOCUMENTS

2016/0358573 A1* 12/2016 Takeuchi ............... G11C 19/28
2017/0186363 A1* 6/2017 Park ..................... G09G 3/3266
2021/0407427 A1* 12/2021 Lee ...................... G09G 3/3266

* cited by examiner

*Primary Examiner* — Hang Lin
(74) *Attorney, Agent, or Firm* — CANTOR COLBURN LLP

(57) ABSTRACT

A gate driver including a plurality of stages. Each of the plurality of stages includes a first masking controlling circuit including a control circuit, a carry output circuit, a first enable node controlling circuit, a first masking circuit, a first gate output circuit, and a second masking controlling circuit including a second enable node controlling circuit, a second masking circuit and a second gate output circuit. The first masking controlling circuit and the second masking controlling circuit shares the control circuit and the carry output circuit.

20 Claims, 23 Drawing Sheets

TP1

TP5

GATE DRIVER AND DISPLAY DEVICE INCLUDING THE SAME

This application claims priority to Korean Patent Application No. 10-2023-0063828, filed on May 17, 2023, and all the benefits accruing therefrom under 35 U.S.C. § 119, the content of which in its entirety is herein incorporated by reference.

BACKGROUND

1. Field

Embodiments of the invention relate to a gate driver and a display device including the gate driver. More particularly, embodiments of the invention relate to a gate driver for performing multi-frequency driving (MFD), and a display device including the gate driver.

2. Description of the Related Art

Reduction of power consumption may be beneficial in a display device employed in a portable device, such as a smartphone, a tablet computer, etc. Accordingly, a low frequency driving technique, which drives or refreshes a display panel at a frequency lower than a normal driving frequency, may be utilized to reduce the power consumption of the display devices.

SUMMARY

In a display device, to which a low frequency driving technique is applied, when a still image is not displayed in an entire region of a display panel, or when the still image is displayed only in a partial region of the display panel, the entire region of the display panel may be driven at the normal driving frequency. Thus, in this case, the low frequency driving may not be performed, and the power consumption may not be reduced.

Embodiments of the invention provide a gate driver capable of providing gate signals at different driving frequencies to respective regions of a display panel.

Embodiments of the invention provide a display device including the gate driver.

In an embodiment of a gate driver according to the invention, the gate driver includes a plurality of stages, where each of the plurality of stages comprises a control circuit which control a voltage of a first node and a voltage of a second node in response to an input signal, a first clock signal, and a second clock signal, a carry output circuit which outputs a carry signal in response to the voltage of the first node and the voltage of the second node, a first enable node controlling circuit which controls a voltage of a first enable node in response to the carry signal, a first enable signal, and a first inverted enable signal, a first masking circuit which controls a voltage of a third node in response to the voltage of the second node and the voltage of the first enable node, a first gate output circuit which output an initialization gate signal in response to the voltage of the first node and the voltage of the third node, a second enable node controlling circuit which controls a voltage of a second enable node in response to the carry signal, a second enable signal, and a second inverted enable signal, a second masking circuit which controls a voltage of a fourth node in response to the voltage of the second node and the voltage of the second enable node, and a second gate output circuit which outputs a compensation gate signal in response to the voltage of the first node and the voltage of the fourth node.

In an embodiment, in a case where the first enable signal has a first level before the carry signal having the first level is output, the first enable node controlling circuit may control the voltage of the first enable node to have a second level, while the carry signal having the first level is output, the first masking circuit may control the voltage of the third node to have the second level in response to the voltage of the first enable node having the second level, and the first gate output circuit may output the initialization gate signal having the first level in response to the voltage of the third node having the second level, in a case where the second enable signal has the first level before the carry signal having the first level is output, the second enable node controlling circuit may control the voltage of the second enable node to have the second level, and while the carry signal having the first level is output, the second masking circuit may control the voltage of the fourth node to have the second level in response to the voltage of the second enable node having the second level, and the second gate output circuit may output the compensation gate signal having the first level in response to the voltage of the fourth node having the second level.

In an embodiment, in a case where a level of the first enable signal is changed from the first level to the second level while the carry signal having the first level is output, the first enable node controlling circuit may hold the voltage of the first enable node as the second level until outputting the carry signal having the first level is completed, and in a case where a level of the second enable signal is changed from the first level to the second level while the carry signal having the first level is output, the second enable node controlling circuit may hold the voltage of the second enable node as the second level until outputting the carry signal having the first level is completed.

In an embodiment, in a case where the first enable signal has a second level before the carry signal having a first level is output, the first enable node controlling circuit may control the voltage of the first enable node to have the first level, while the carry signal having the first level is output, the first masking circuit may controls the voltage of the third node to have the first level in response to the voltage of the first enable node having the first level, and the first gate output circuit may not output the initialization gate signal having the first level in response to the voltage of the third node having the first level, in a case where the second enable signal has the second level before the carry signal having the first level is output, the second enable node controlling circuit may control the voltage of the second enable node to have the first level, and while the carry signal having the first level is output, the second masking circuit may control the voltage of the fourth node to have the first level in response to the voltage of the second enable node having the first level, and the second gate output circuit may not output the compensation gate signal having the first level in response to the voltage of the fourth node having the first level.

In an embodiment, in a case where a level of the first enable signal is changed from the second level to the first level while the carry signal having the first level is output, the first enable node controlling circuit may hold the voltage of the first enable node as the first level until outputting the carry signal having the first level is completed, and in a case where a level of the second enable signal is changed from the second level to the first level while the carry signal having the first level is output, the second enable node controlling circuit may hold the voltage of the second enable node as the first level until outputting the carry signal having the first level is completed.

In an embodiment, while the carry signal having a first level is output, the first enable node controlling circuit may hold the voltage of the first enable node as a previous level, and while the carry signal having the first level is output, the second enable node controlling circuit may hold the voltage of the second enable node as a previous level.

In an embodiment, when the carry signal having a first level is not output, when the first enable signal has the first level, and when the first inverted enable signal has a second level, the first enable node controlling circuit may control the voltage of the first enable node to have the second level. In such an embodiment, when the carry signal having the first level is not output, when the first enable signal has the second level, and when the first inverted enable signal has the first level, the first enable node controlling circuit may control the voltage of the first enable node to have the first level. In such an embodiment, when the carry signal having the first level is not output, when the second enable signal may have the first level, and when the second inverted enable signal has the second level, the second enable node controlling circuit may control the voltage of the second enable node to have the second level. In such an embodiment, when the carry signal having the first level is not output, when the second enable signal has the second level, and when the second inverted enable signal has the first level, the second enable node controlling circuit may control the voltage of the second enable node to have the first level.

In an embodiment, the first enable node controlling circuit may include fourteenth and fifteenth transistors coupled to each other in series between a high gate voltage line and the first enable node, where the fourteenth transistor may be turned on in response to the carry signal, and the fifteenth transistor may be turned on in response to the first enable signal, and sixteenth and seventeenth transistors coupled to each other in series between the first enable node and a low gate voltage line, where the sixteenth transistor may be turned on in response to the first inverted enable signal, and the seventeenth transistor may be turned on in response to the carry signal, and the second enable node controlling circuit may include twenty-third and twenty-fourth transistors coupled to each other in series between the high gate voltage line and the second enable node, where the twenty-third transistor may be turned on in response to the carry signal, and the twenty-fourth transistor may be turned on in response to the second enable signal, and twenty-fifth and twenty-sixth transistors coupled to each other in series between the second enable node and the low gate voltage line, where the twenty-fifth transistor may be turned on in response to the second inverted enable signal, the twenty-sixth transistor may be turned on in response to the carry signal.

In an embodiment, the fourteenth transistor may include a gate which receives the carry signal, a first terminal coupled to the high gate voltage line, and a second terminal, the fifteenth transistor may include a gate which receives the first enable signal, a first terminal coupled to the second terminal of the fourteenth transistor, and a second terminal coupled to the first enable node, the sixteenth transistor may include a gate which receives the first inverted enable signal, a first terminal coupled to the first enable node, and a second terminal, the seventeenth transistor may include a gate which receives the carry signal, a first terminal coupled to the second terminal of the sixteenth transistor, and a second terminal coupled to the low gate voltage line, the twenty-third transistor may include a gate which receives the carry signal, a first terminal coupled to the high gate voltage line, and a second terminal, the twenty-fourth transistor may include a gate which receives the second enable signal, a first terminal coupled to the second terminal of the twenty-third transistor, and a second terminal coupled to the second enable node, the twenty-fifth transistor may include a gate which receives the second inverted enable signal, a first terminal coupled to the second enable node, and a second terminal, and the twenty-sixth transistor may include a gate which receives the carry signal, a first terminal coupled to the second terminal of the twenty-fifth transistor, and a second terminal coupled to the low gate voltage line.

In an embodiment, the first enable node controlling circuit may further include a fifth capacitor coupled between the first enable node and the low gate voltage line, and the second enable node controlling circuit may further include a seventh capacitor coupled between the second enable node and the low gate voltage line.

In an embodiment, the first masking circuit may disconnect the second node from the third node when the voltage of the first enable node has a first level, and couples the second node to the third node when the voltage of the first enable node has a second level, and the second masking circuit may disconnect the second node from the fourth node when the voltage of the second enable node has the first level, and may couple the second node to the fourth node when the voltage of the second enable node has the second level.

In an embodiment, the first masking circuit may include an eighteenth transistor which selectively couples the second node to the third node in response to the voltage of the first enable node, and the second masking circuit may include a twenty-seventh transistor which selectively couples the second node to the fourth node in response to the voltage of the second enable node.

In an embodiment, the eighteenth transistor may include a gate coupled to the first enable node, a first terminal coupled to the second node, and a second terminal coupled to the third node, and the twenty-seventh transistor may include a gate coupled to the second enable node, a first terminal coupled to the second node, and a second terminal coupled to the fourth node.

In an embodiment, the first masking circuit may further include a sixth capacitor coupled between a high gate voltage line and the third node, and nineteenth and twentieth transistors coupled to each other in series between the high gate voltage line and the third node, where the nineteenth transistor may be turned on in response to the carry signal, and the twentieth transistor may be turned on in response to the first enable signal, and the second masking circuit may further include an eighth capacitor coupled between the high gate voltage line and the fourth node, and twenty-eighth and twenty-ninth transistors coupled to each other in series between the high gate voltage line and the fourth node, where the twenty-eighth transistor may be turned on in response to the carry signal, the twenty-ninth transistor may be turned on in response to the second enable signal.

In an embodiment, the nineteenth transistor may include a gate which receives the carry signal, a first terminal coupled to the high gate voltage line, and a second terminal, the twentieth transistor may include a gate which receives the first enable signal, a first terminal coupled to the second terminal of the nineteenth transistor, and a second terminal coupled to the third node, the twenty-eighth transistor may include a gate which receives the carry signal, a first terminal coupled to the high gate voltage line, and a second terminal, and the twenty-ninth transistor may include a gate which receives the second enable signal, a first terminal coupled to the second terminal of the twenty-eighth transistor, and a second terminal coupled to the fourth node.

In an embodiment, the carry output circuit may include a twelfth transistor including a gate coupled to the second node, a first terminal coupled to a high gate voltage line, and a second terminal coupled to a carry output node, and a thirteenth transistor including a gate coupled to the first node, a first terminal coupled to the carry output node, and a second terminal coupled to a low gate voltage line.

In an embodiment, the first gate output circuit may include a twenty-first transistor including a gate coupled to the third node, a first terminal coupled to a high gate voltage line, and a second terminal coupled to a first gate output node, and a twenty-second transistor including a gate coupled to the first node, a first terminal coupled to the first gate output node, and a second terminal coupled to a low gate voltage line, and the second gate output circuit may include a thirtieth transistor including a gate coupled to the fourth node, a first terminal coupled to the high gate voltage line, and a second terminal coupled to a second gate output node, and a thirty-first transistor including a gate coupled to the first node, a first terminal coupled to the second gate output node, and a second terminal coupled to the low gate voltage line.

In an embodiment of a display device according to the invention, the display device comprises a display panel including a pixel, a data driver which provides a data voltage to the pixel, a gate driver which provide an initialization gate signal and a compensation gate signal to the pixel, and a driving controller which controls the data driver and the gate driver. In such an embodiment, the gate driver includes a plurality of stages, and each of the stages comprises a control circuit which controls a voltage of a first node and a voltage of a second node in response to an input signal, a first clock signal, and a second clock signal, a carry output circuit which outputs a carry signal in response to the voltage of the first node and the voltage of the second node, a first masking controlling circuit which controls a voltage of a first enable node in response to the carry signal, a first enable signal, and a first inverted enable signal, controls a voltage of a third node in response to the voltage of the second node and the voltage of the first enable node, and outputs an initialization gate signal in response to the voltage of the first node and the voltage of the third node, and a second masking controlling circuit which controls a voltage of a second enable node in response to the carry signal, a second enable signal, and a second inverted enable signal, controls a voltage of a fourth node in response to the voltage of the second node and the voltage of the second enable node, and outputs a compensation gate signal in response to the voltage of the first node and the voltage of the fourth node.

In an embodiment, in a case where the first enable signal has a first level before the carry signal having the first level is output, the first enable node controlling circuit may control the voltage of the first enable node to a second level, while the carry signal having the first level is output, the first masking circuit may control the voltage of the third node to have the second level in response to the voltage of the first enable node having the second level, and the first gate output circuit may output the initialization gate signal having the first level in response to the voltage of the third node having the second level, in a case where the second enable signal has the first level before the carry signal having the first level is output, the second enable node controlling circuit may control the voltage of the second enable node to have the second level, and while the carry signal having the first level is output, the second masking circuit may control the voltage of the fourth node to have the second level in response to the voltage of the second enable node having the second level, and the second gate output circuit may output the compensation gate signal having the first level in response to the voltage of the fourth node having the second level.

In an embodiment, in a case where a level of the first enable signal is changed from the first level to the second level while the carry signal having the first level is output, the first enable node controlling circuit may hold the voltage of the first enable node as the second level until outputting the carry signal having the first level is completed, and in a case where a level of the second enable signal is changed from the first level to the second level while the carry signal having the first level is output, the second enable node controlling circuit may hold the voltage of the second enable node as the second level until outputting the carry signal having the first level is completed.

In the gate driver and the display device according to embodiments, each stage may include the first enable node controlling circuit that controls the voltage of the first enable node based on the first enable signal, and holds the voltage of the first enable node while the carry signal is output, and the first masking circuit that selectively couples the second node and the third node in response to the voltage of the first enable node. In such embodiments, each stage may include the second enable node controlling circuit that controls the voltage of the second enable node based on the second enable signal, and holds the voltage of the second enable node while the carry signal is output, and the second masking circuit that selectively couples the second node and the fourth node in response to the voltage of the second enable node. Accordingly, each of the initialization gate signals and the compensation gate signals generated by the gate driver may have a time length corresponding to two or more horizontal times, and the initialization gate signals and the compensation gate signals may be provided at different driving frequencies to respective regions of the display panel. In such embodiments, the first masking controlling circuit and the second masking controlling circuit shares the control circuit and the carry output circuit such that power consumption and area of the gate driver may be reduced.

BRIEF DESCRIPTION OF THE DRAWINGS

The above and other features of embodiments of the invention will become more apparent by describing in detailed embodiments thereof with reference to the accompanying drawings, in which.

DETAILED DESCRIPTION

Figure 1:
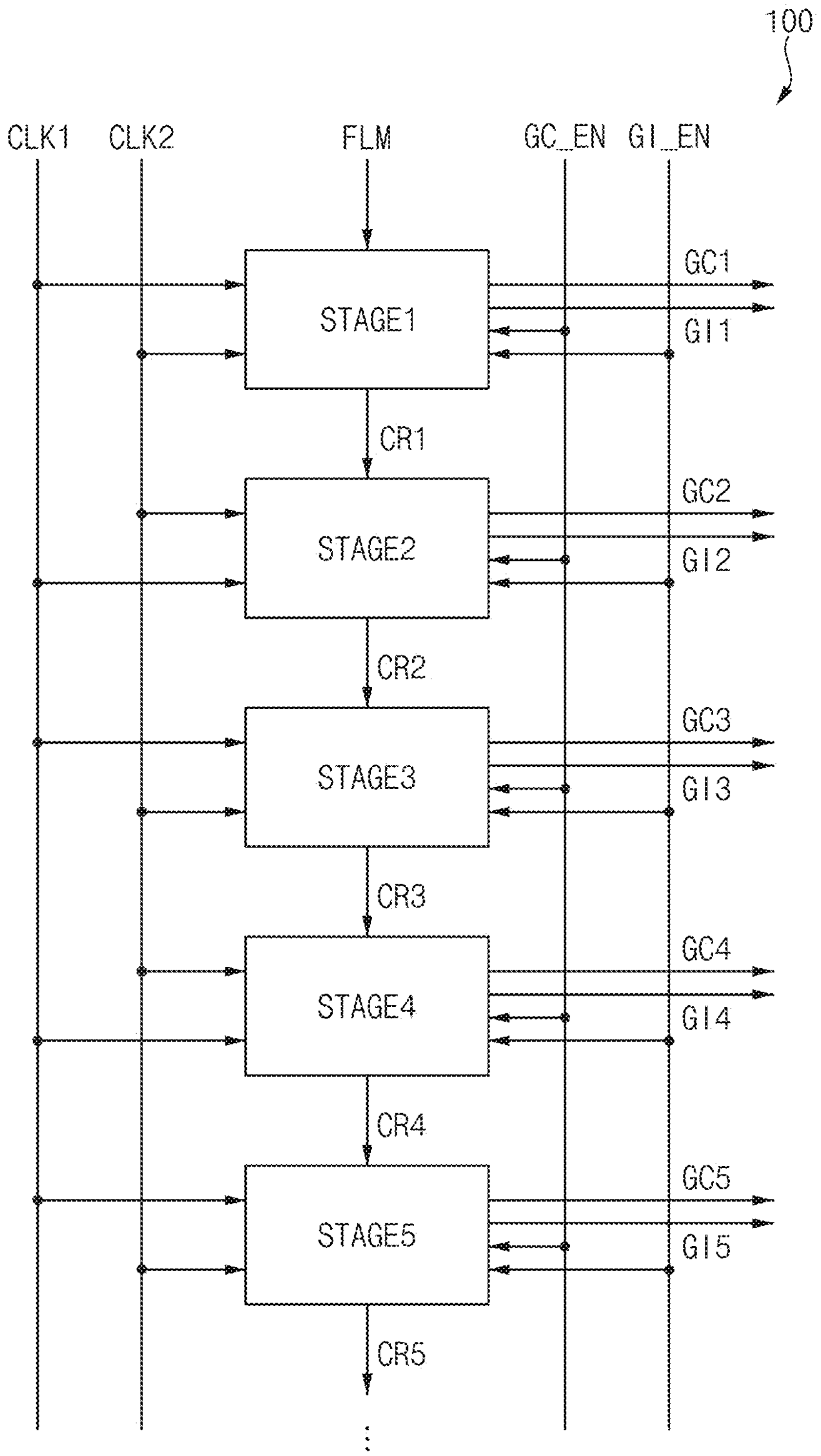
FIG. 1 is a block diagram illustrating a gate driver according to embodiments.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. Thus, reference to "an" element in a claim followed by reference to "the" element is inclusive of one element and a plurality of the elements. For example, "an element" has the same meaning as "at least one element," unless the context clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The terms "below" or "beneath" can, therefore, encompass both an orientation of above and below.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, embodiments of the invention will be described in detail with reference to the accompanying drawings.

Figure 2A:
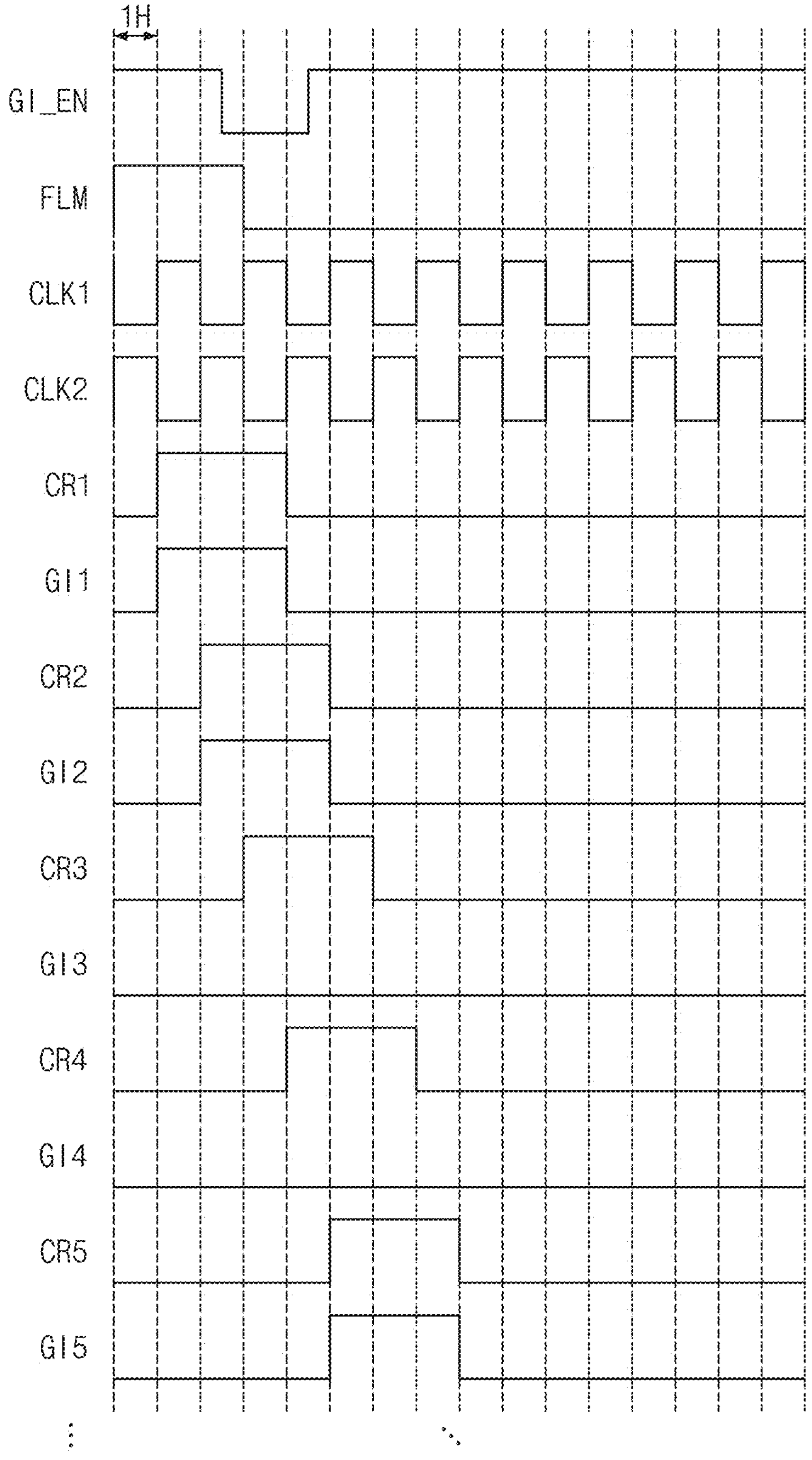
FIGS. 2A and 2B is a timing diagram for describing an example of an operation of a gate driver according to embodiments.
Figure 2B:
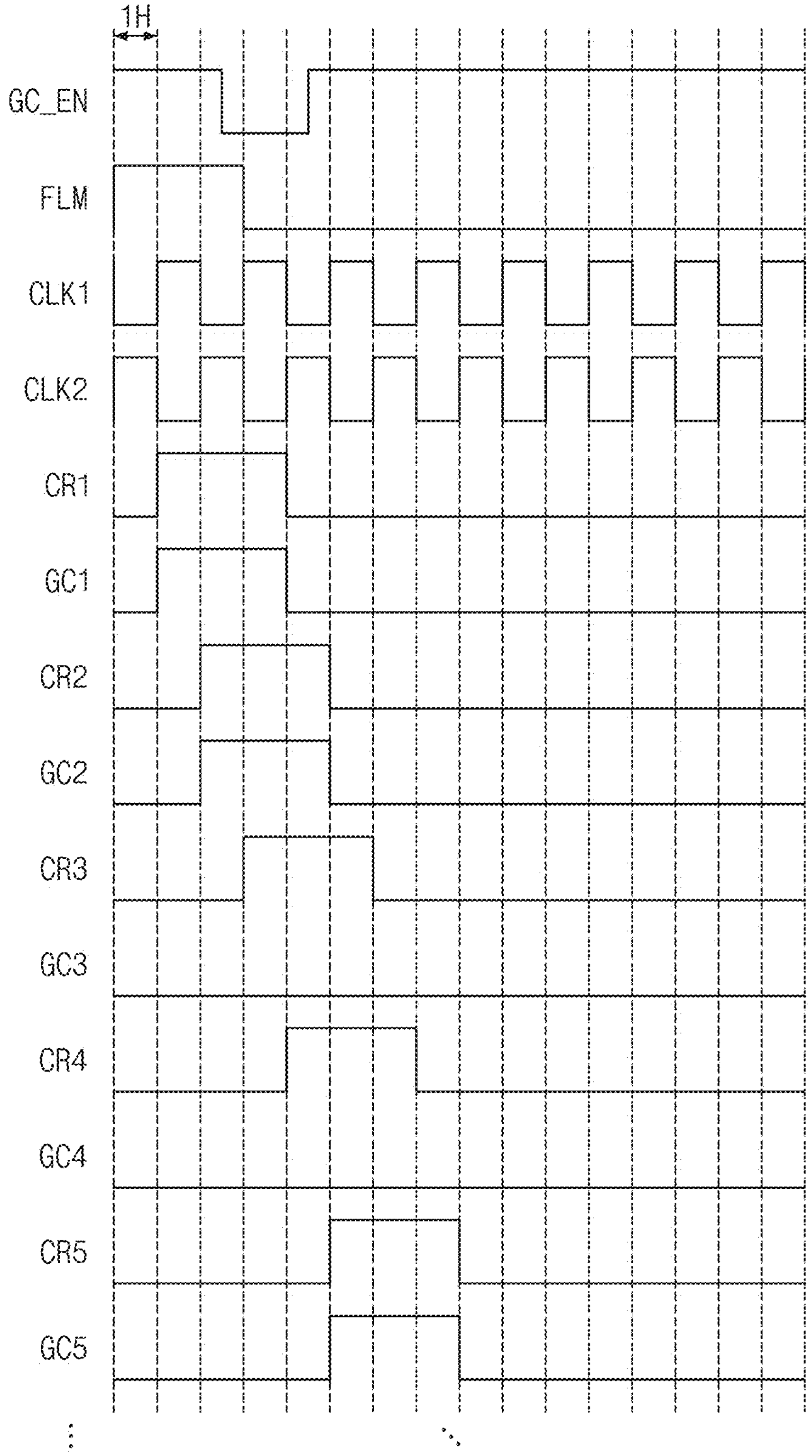

FIG. 1 is a block diagram illustrating a gate driver according to embodiments. FIGS. 2A and 2B is a timing diagram for describing an example of an operation of a gate driver according to embodiments.

Referring to FIG. 1, a gate driver 100 according to embodiments may include a plurality of stages STAGE1, STAGE2, STAGE3, STAGE4, STAGE5, . . . .

In an embodiment, the stages STAGE1, STAGE2, STAGE3, STAGE4, STAGE5, . . . may receive a first clock signal CLK1, a second clock signal CLK2, a gate start signal FLM, a first enable signal GI_EN and a second enable signal GC_EN. In an embodiment, the stages STAGE1, STAGE2, STAGE3, STAGE4, STAGE5, . . . may further receive a first inverted enable signal that is an inverted signal of the first enable signal GI_EN, and a second inverted enable signal that is an inverted signal of the second enable signal GC_EN. The first clock signal CLK1 and the second clock signal CLK2 may have different phases from each other. In an embodiment, for example, as illustrated in FIGS. 2A and 2B, the first clock signal CLK1 and the second clock signal CLK2 may have opposite phases, respectively.

The stages STAGE1, STAGE2, STAGE3, STAGE4, STAGE5, . . . may sequentially generate carry signals CR1, CR2, CR3, CR4, CR5, . . . . In an embodiment, odd-numbered stages STAGE1, STAGE3, STAGE5, . . . may receive an input signal (e.g., the gate start signal FLM or a previous carry signal CR2, CR4, . . . ) having a first level (e.g., a high level) in response to the first clock signal CLK1 having a second level (e.g., a low level), and may initiate (or start) outputting the carry signal CR1, CR3, CR5, . . . having the first level in response to the second clock signal CLK2 having the second level. In such an embodiment, even-numbered stages STAGE2, STAGE4, . . . may receive an input signal (e.g., a previous carry signal CR1, CR3, . . . ) having the first level in response to the second clock signal CLK2 having the second level, and may initiate outputting the carry signal CR2, CR4, . . . having the first level in response to the first clock signal CLK1 having the second level.

In an embodiment, as illustrated in FIGS. 2A and 2B, each carry signal CR1, CR2, CR3, CR4, CR5, . . . may be an active high signal having the high level as an active level, and an active period of each carry signal CR1, CR2, CR3, CR4, CR5, . . . may have a time length (or period) longer than one horizontal time 1H (i.e., a time allocated for each pixel row of a display panel). In an embodiment, for example, the active period of each carry signal CR1, CR2, CR3, CR4, CR5, . . . may have a time length corresponding to (or substantially equal to) two or more horizontal times. Thus, active periods of adjacent carry signals (e.g., the first through third carry signals CR1, CR2 and CR3) may overlap in time. Although FIGS. 2A and 2B illustrates an embodiment where the active period of each carry signal CR1, CR2, CR3, CR4, CR5, . . . has a time length corresponding to three horizontal times, in other embodiments, the time length of the active period of each carry signal CR1, CR2, CR3, CR4, CR5, . . . may correspond to any number of horizontal times.

The stages STAGE1, STAGE2, STAGE3, STAGE4, STAGE5, . . . may selectively output initialization gate signals GI1, GI2, GI3, GI4, GI5, . . . based on a level of the first enable signal GI_EN, and selectively output compensation gate signals GC1, GC2, GC3, GC4, GC5, . . . based on a level of the second enable signal GC_EN.

In an embodiment, each stage (e.g., the first stage STAGE1) may output an initialization gate signal (e.g., a first initialization gate signal GI1) having a phase substantially the same as a phase of a carry signal (e.g., the first carry signal CR1) in a case where the first enable signal GI_EN having the first level when outputting the carry signal having the first level is initiated (or started). In such an embodiment, each stage (e.g., the first stage STAGE1) may output a compensation gate signal (e.g., a first compensation gate signal GC1) having a phase substantially the same as the phase of the carry signal (e.g., the first carry signal CR1) in a case where the second enable signal GC_EN having the first level when outputting the carry signal having the first level is initiated (or started).

In such an embodiment, even if a level (or a voltage level) of the first enable signal GI_EN is changed from the first level to the second level while the carry signal having the first level is output or while the initialization gate signal having the first level is output, the stage may continue outputting the initialization gate signal having the first level until outputting the carry signal having the first level is completed. In such an embodiment, even if a level (or a voltage level) of the second enable signal GC_EN is changed from the first level to the second level while the carry signal having the first level is output or while the compensation gate signal having the first level is output, the stage may continue outputting the compensation gate signal having the first level until outputting the carry signal having the first level is completed.

In an embodiment, in a case where the first enable signal GI_EN has the second level when outputting the carry signal having the first level is initiated, each stage may not output the initialization gate signal having the first level. In such an embodiment, in a case where the second enable signal GC_EN has the second level when outputting the carry signal having the first level is initiated, each stage may not output the compensation gate signal having the first level.

In such an embodiment, even if the level of the first enable signal is changed from the second level to the first level while the carry signal having the first level is output, the stage may not output the initialization gate signal having the first level. In such an embodiment, even if the level of the second enable signal is changed from the second level to the first level while the carry signal having the first level is output, the stage may not output the compensation gate signal having the first level.

In an embodiment, as described above, the stages STAGE1, STAGE2, STAGE3, STAGE4, STAGE5, . . . may selectively output the initialization gate signals GI1, GI2, GI3, GI4, GI5, . . . based on the level of the first enable signal GI_EN, and selectively output the compensation gate signals GC1, GC2, GC3, GC4, GC5, . . . based on the level of the second enable signal GC_EN. Thus, the gate driver 100 may provide the initialization gate signals GI1, GI2, GI3, GI4, GI5, . . . and the compensation gate signals GC1, GC2, GC3, GC4, GC5, . . . at different driving frequencies to respective regions of the display panel.

Figure 3:
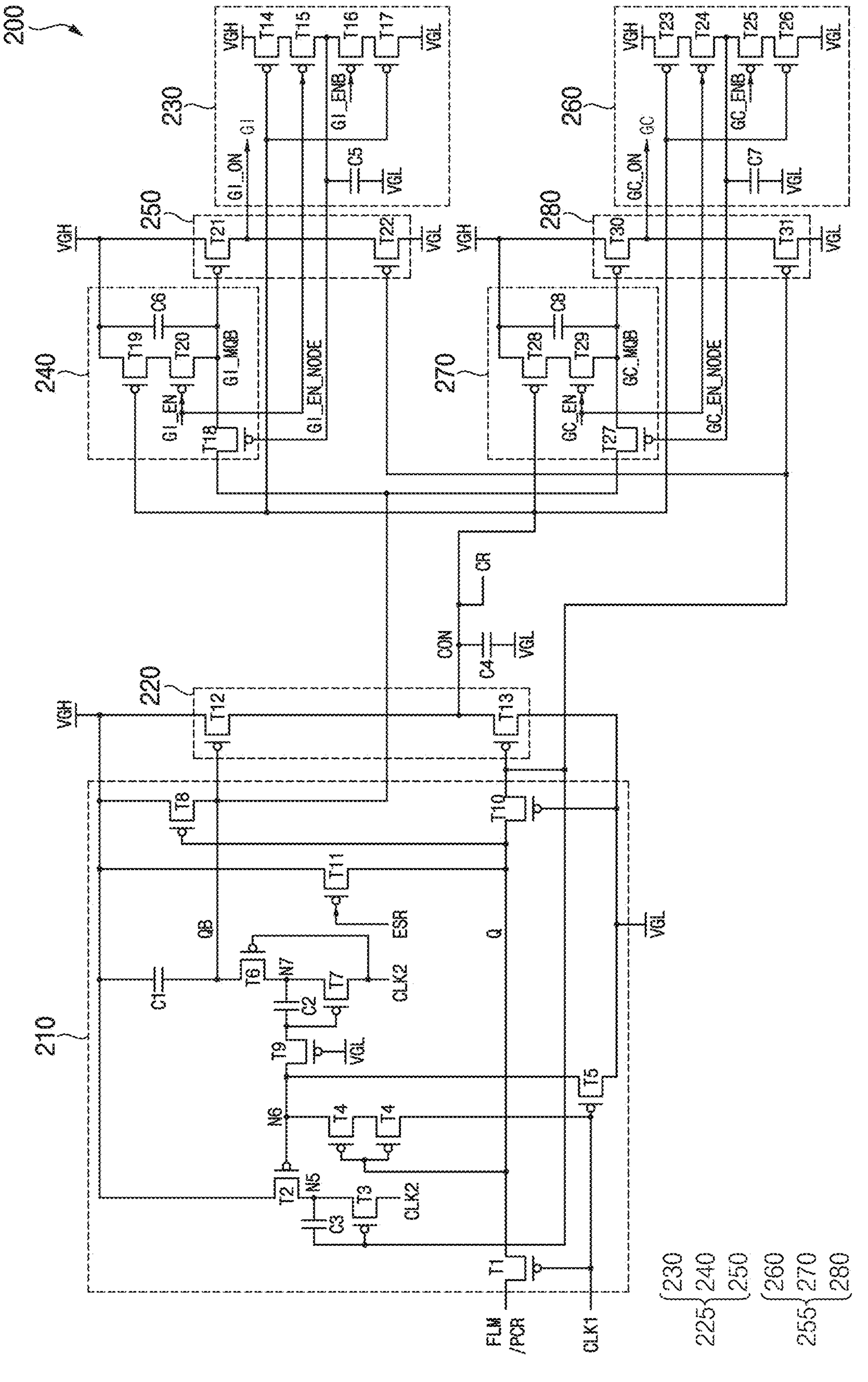
FIG. 3 is a circuit diagram illustrating each stage included in a gate driver according to embodiments.

FIG. 3 is a circuit diagram illustrating each stage included in a gate driver according to embodiments.

Referring to FIG. 3, each stage 200 of a gate driver according to embodiments may include a control circuit 210, a carry output circuit 220, a first masking controlling circuit 225 and a second masking controlling circuit 255. The first masking controlling circuit 225 may include a first enable node controlling circuit 230, a first masking circuit 240 and a first gate output circuit 250. The second masking controlling circuit 255 may include a second enable node controlling circuit 260, a second masking circuit 270 and a second gate output circuit 280.

The control circuit 210 may control a voltage of a first node Q and a voltage of a second node QB in response to an input signal FLM/PCR, a first clock signal CLK1, and a second clock signal CLK2. The carry output circuit 220 may output a carry signal CR in response to the voltage of the first node Q and the voltage of the second node QB.

The first enable node controlling circuit 230 may control a voltage of a first enable node GI_EN_NODE in response to the carry signal CR, the first enable signal GI_EN, and the first inverted enable signal GI_ENB. The first masking circuit 240 may control a voltage of a third node GI_MQB in response to the voltage of the second node QB and the voltage of the first enable node GI_EN_NODE. The first gate output circuit 250 may output the initialization gate signal GI in response to the voltage of the first node Q and the voltage of the third node GI_MQB.

The second enable node controlling circuit 260 may control a voltage of a second enable node GC_EB_NODE in response to the carry signal CR, the second enable signal GC_EN, and the second inverted enable signal GC_ENB. The second masking circuit 270 may control a voltage of a fourth node GC_MQB in response to the voltage of the second node QB and the voltage of the second enable node GC_EN_NODE. The second gate output circuit 280 may output the compensation gate signal GC in response to the voltage of the first node Q and the voltage of the fourth node GC_MQB.

In an embodiment, each stage 200 may further include a fourth capacitor C4 coupled to a carry output node CON at which the carry signal CR is output.

When the input signal FLM/PCR having the first level is not received, the control circuit 210 may control the voltage of the first node Q to have the second level, and may control the voltage of the second node QB to have the first level. The input signal FLM/PCR may be the gate start signal FLM with respect to a first stage, and may be the previous carry signal PCR, that is, the carry signal CR of a previous stage.

In an embodiment, as illustrated in FIG. 3, the control circuit 210 (of an odd-numbered stage 200) may control the voltage of the first node Q to have the first level in response to the first clock signal CLK1 having the second level and the input signal FLM/PCR having the first level, and may control the voltage of the second node QB to have the second level in response to the second clock signal CLK2 having the second level and the voltage of the first node Q having the first level. In such an embodiment, in an even-numbered stage, the control circuit 210 may control the voltage of the first node Q to have the first level in response to the second clock signal CLK2 having the second level and the input signal FLM/PCR having the first level, and may control the voltage of the second node QB to have the second level in response to the first clock signal CLK1 having the second level and the voltage of the first node Q having the first level.

The control circuit 210 may include first through eighth transistors T1 through T8 and first through third capacitors C1 through C3. In an embodiment, the control circuit 210 may further include a ninth transistor T9 connected to a sixth node N6, a tenth transistor T10 connected to the first node Q, and an eleventh transistor T11 that applies a high gate voltage VGH to the first node Q in response to a global control signal ESR.

The first transistor T1 may apply the input signal FLM/PCR to the first node Q in response to the first clock signal CLK1 having the low level. For example, the first transistor T1 may include a gate that receives the first clock signal CLK1, a first terminal that receives the input signal FLM/PCR, and a second terminal coupled to (or connected to) the first node Q.

Figure 4:
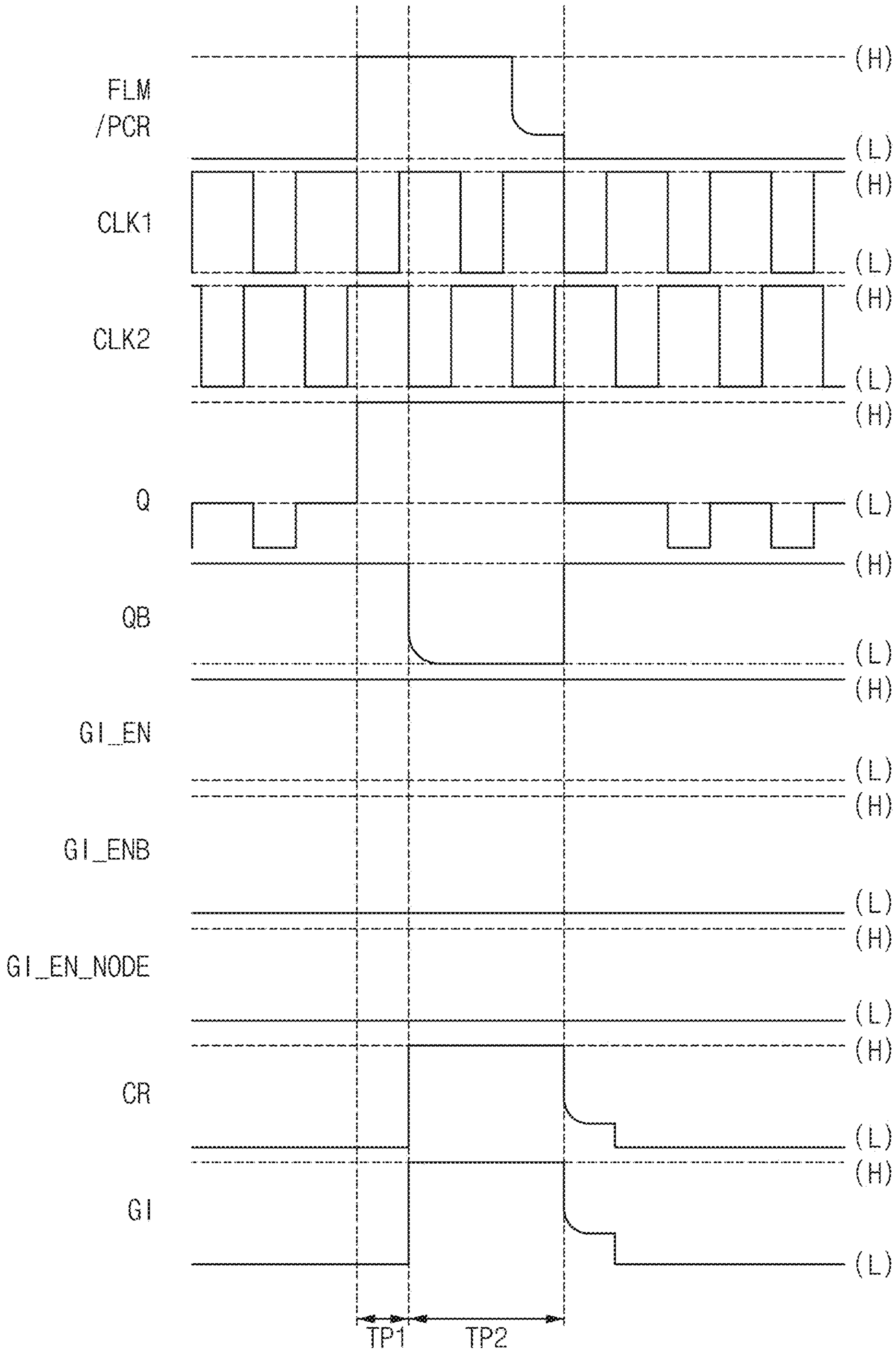
FIG. 4 is a timing diagram for describing an example of an operation of a stage of FIG. 3 when a first enable signal has a first level.

The third capacitor C3 may include a first electrode coupled to the first node Q (through the tenth transistor T10), and a second electrode coupled to a fifth node N5. The second transistor T2 may apply the high gate voltage VGH to the fifth node N5 in response to a voltage of the sixth node N6. The third transistor T3 may apply the second clock signal CLK2 to the fifth node N5 in response to the voltage of the first node Q. In such an embodiment, as illustrated in FIG. 4, when the second clock signal CLK2 becomes the high level H, the voltage of the first node Q may become a level lower than the low level L by the third capacitor C3, the second transistor T2 and the third transistor T3. For example, the second transistor T2 may include a gate coupled to the sixth node N6, a first terminal that receives the high gate voltage VGH, and a second terminal coupled to the fifth node N5. The third transistor T3 may include a gate coupled to the first node Q (through the tenth transistor T10), a first terminal coupled to the fifth node N5, and a second terminal that receives the second clock signal CLK2.

The fourth transistor T4 may apply the first clock signal CLK1 to the sixth node N6 in response to the voltage of the first node Q. The fifth transistor T5 may apply a low gate voltage VGL to the sixth node N6 in response to the first clock signal CLK1. For example, the fourth transistor T4 may include a gate coupled to the first node Q, a first terminal coupled to the sixth node N6, and a second terminal that receives the first clock signal CLK1. For example, the fifth transistor T5 may include a gate that receives the first clock signal CLK1, a first terminal coupled to the sixth node N6, and a second terminal that receives the low gate voltage VGL.

The first capacitor C1 may include a first electrode that receives the high gate voltage VGH and a second electrode coupled to the second node QB. The second capacitor C2 may include a first electrode coupled to the sixth node N6 (through the ninth transistor T9) and a second electrode coupled to a seventh node N7.

The sixth transistor T6 may couple (or connect) the second node QB and the seventh node N7 to each other in response to the second clock signal CLK2. The seventh transistor T7 may apply the second clock signal CLK2 to the seventh node N7 in response to the voltage of the sixth node N6. For example, the sixth transistor T6 may include a gate that receives the second clock signal CLK2, a first terminal coupled to the second node QB, and a second terminal coupled to the seventh node N7. For example, the seventh transistor T7 may include a gate coupled to the sixth node N6 (through the ninth transistor T9), a first terminal coupled to the seventh node N7, and a second terminal that receives the second clock signal CLK2.

The eighth transistor T8 may apply the high gate voltage VGH to the second node QB in response to the voltage of the first node Q. For example, the eighth transistor T8 may include a gate coupled to the first node Q, a first terminal that receives the high gate voltage VGH, and a second terminal coupled to the second node QB.

The ninth transistor T9 may be connected to the sixth node N6, and the tenth transistor T10 may be connected to the first node Q. A gate of the ninth transistor T9 and a gate of the tenth transistor T10 may receive the low gate voltage VGL.

The eleventh transistor T11 may control the voltage of the first node Q to have the high level in response to the global control signal ESR. In an embodiment, the global control signal ESR may be substantially simultaneously applied to the stages of the gate driver, and the stages may substantially simultaneously output the initialization gate signals GI in response to the global control signal ESR. For example, the eleventh transistor T11 may include a gate that receives the global control signal ESR, a first terminal that receives the high gate voltage VGH, and a second terminal coupled to the first node Q.

Although FIG. 3 illustrates an embodiment in which the control circuit 210 includes the first through eleventh transistors T1 through T11 and the first through third capacitors C1 through C3, a configuration of the control circuit 210 of each stage 200 of the gate driver according to embodiments is not limited to the example of FIG. 3. That is, the control circuit 210 may have any configuration that controls the voltage of the first node Q and the voltage of the second node QB in response to the input signal FLM/PCR, the first clock signal CLK1 and the second clock signal CLK2.

While the voltage of the first node Q has the first level, and the voltage of the second node QB has the second level, the carry output circuit 220 may output the carry signal CR having the first level. In an embodiment, the carry output circuit 220 may include a twelfth transistor T12 that outputs the high gate voltage VGH as the carry signal CR in response to the voltage of the second node QB, and a thirteenth transistor T13 that outputs the low gate voltage VGL as the carry signal CR in response to the voltage of the first node Q. For example, the twelfth transistor T12 may include a gate coupled to the second node QB, a first terminal coupled to a line of the high gate voltage VGH, and a second terminal coupled to the carry output node CON at which the carry signal CR is output. For example, the thirteenth transistor T13 may include a gate coupled to the first node Q, a first terminal coupled to the carry output node CON, and a second terminal coupled to a line of the low gate voltage VGL.

In an embodiment, when the carry signal CR having the first level is not output, the first enable signal GI_EN has the first level, and the first inverted enable signal GI_ENB has the second level, the first enable node controlling circuit 230 may control the voltage of the first enable node GI_EN_NODE to have the second level. In such an embodiment, when the carry signal CR having the first level is not output, the first enable signal GI_EN has the second level, and the first inverted enable signal GI_ENB has the first level, the first enable node controlling circuit 230 may control the voltage of the first enable node GI_EN_NODE to have the first level. In such an embodiment, while the carry signal CR having the first level is output, the first enable node controlling circuit 230 may hold the voltage of the first enable node GI_EN_NODE as a previous level.

In an embodiment, the first enable node controlling circuit 230 may include fourteenth and fifteenth transistors T14 and T15 coupled to each other in series between the line of the high gate voltage VGH and the first enable node GI_EN_NODE, and sixteenth and seventeenth transistors T16 and T17 coupled to each other in series between the first enable node GI_EN_NODE and the line of the low gate voltage VGL. The fourteen transistor T14 may be turned on in response to the carry signal CR, the fifteenth transistor T15 may be turned on in response to the first enable signal GI_EN, the sixteenth transistor T16 may be turned on in response to the first inverted enable signal GI_ENB, and the seventeenth transistor T17 may be turned on in response to the carry signal CR. For example, the fourteenth transistor T14 may include a gate that receives the carry signal CR, a first terminal coupled to the line of the high gate voltage VGH, and a second terminal. For example, the fifteenth transistor T15 may include a gate that receives the first enable signal GI_EN, a first terminal coupled to the second terminal of the fourteenth transistor T14, and a second terminal coupled to the first enable node GI_EN_NODE. The sixteenth transistor T16 may include a gate that receives the first inverted enable signal GI_ENB, a first terminal coupled to the first enable node GI_EN_NODE, and a second terminal. For example, the seventeenth transistor T17 may include a gate that receives the carry signal CR, a first terminal coupled to the second terminal of the sixteenth transistor T16, and a second terminal coupled to the line of the low gate voltage VGL.

In an embodiment, the first enable node controlling circuit 230 may further include a fifth capacitor C5 coupled between the first enable node GI_EN_NODE and the line of the low gate voltage VGL. For example, the fifth capacitor C5 may include a first electrode coupled to the first enable node GI_EN_NODE, and a second electrode coupled to the line of the low gate voltage VGL.

The first masking circuit 240 may separate (or disconnect) the second node QB from the third node GI_MQB when the voltage of the first enable node GI_EN_NODE has the first level, and may couple the second node QB to the third node GI_MQB when the voltage of the first enable node GI_EN_NODE has the second level.

In an embodiment, the first masking circuit 240 may include an eighteenth transistor T18 that selectively couples the second node QB to the third node GI_MQB in response to the voltage of the first enable node GI_EN_NODE. For example, the eighteenth transistor T18 may include a gate coupled to the first enable node GI_EN_NODE, a first terminal coupled to the second node QB, and a second terminal coupled to the third node GI_MQB.

In an embodiment, the first masking circuit 240 may further include a sixth capacitor C6 coupled between the line of the high gate voltage VGH and the third node GI_MQB, and nineteenth and twentieth transistors T19 and T20 coupled to each other in series between the line of the high gate voltage VGH and the third node GI_MQB. The nineteenth transistor T19 may be turned on in response to the carry signal CR, and the twentieth transistor T20 may be turned on in response to the first enable signal GI_EN. For example, the nineteenth transistor T19 may include a gate that receives the carry signal CR, a first terminal coupled to the line of the high gate voltage VGH, and a second terminal. For example, the twentieth transistor T20 may include a gate that receives the first enable signal GI_EN, a first terminal coupled to the second terminal of the nineteenth transistor T19, and a second terminal coupled to the third node GI_MQB.

The first gate output circuit 250 may output the initialization gate signal GI having the first level while the voltage of the first node Q has the first level and the voltage of the third node GI_MQB has the second level. In an embodiment, the first gate output circuit 250 may include a twenty-first transistor T21 that outputs the high gate voltage VGH as the initialization gate signal GI in response to the voltage of the third node GI_MQB, and a twenty-second transistor T22 that outputs the low gate voltage VGL as the initialization gate signal GI in response to the voltage of the first node Q. For example, the twenty-first transistor T21 may include a gate coupled to the third node GI_MQB, a first terminal coupled to line of the high gate voltage VGH, and a second terminal coupled to a first gate output node GI_ON at which the initialization gate signal GI is output. For example, the twenty-second transistor T22 may include a gate coupled to the first node Q, a first terminal coupled to the first gate output node GI_ON, and a second terminal coupled to the line of the low gate voltage VGL.

In an embodiment, when the carry signal CR having the first level is not output, the second enable signal GC_EN has the first level, and the second inverted enable signal GC_ENB has the second level, the second enable node controlling circuit 260 may control the voltage of the second enable node GC_EN_NODE to have the second level. In such an embodiment, when the carry signal CR having the first level is not output, the second enable signal GC_EN has the second level, and the second inverted enable signal GC_ENB has the first level, the second enable node controlling circuit 260 may control the voltage of the second enable node GC_EN_NODE to have the first level. In such an embodiment, while the carry signal CR having the first level is output, the second enable node controlling circuit 260 may hold the voltage of the second enable node GC_EN_NODE as a previous level.

In an embodiment, the second enable node controlling circuit 260 may include twenty-third and twenty-fourth transistors T23 and T24 coupled to each other in series between the line of the high gate voltage VGH and the second enable node GC_EN_NODE, and twenty-fifth and twenty-sixth transistors T25 and T26 coupled to each other in series between the second enable node GC_EN_NODE and the line of the low gate voltage VGL. The twenty-third transistor T23 may be turned on in response to the carry signal CR, the twenty-fourth transistor T24 may be turned on in response to the second enable signal GC_EN, the twenty-fifth transistor T25 may be turned on in response to the second inverted enable signal GC_ENB, and the twenty-sixth transistor T26 may be turned on in response to the carry signal CR. For example, the twenty-third transistor T23 may include a gate that receives the carry signal CR, a first terminal coupled to the line of the high gate voltage VGH, and a second terminal. For example, the twenty-fourth transistor T24 may include a gate that receives the second enable signal GC_EN, a first terminal coupled to the second terminal of the twenty-third transistor T23, and a second terminal coupled to the second enable node GC_EN_NODE. For example, the twenty-fifth transistor T25 may include a gate that receives the second inverted enable signal GC_ENB, a first terminal coupled to the second enable node GC_EN_NODE, and a second terminal. For example, the twenty-sixth transistor T267 may include a gate that receives the carry signal CR, a first terminal coupled to the second terminal of the twenty-fifth transistor T25, and a second terminal coupled to the line of the low gate voltage VGL.

In an embodiment, the second enable node controlling circuit 260 may further include a seventh capacitor C7 coupled between the second enable node GC_EN_NODE and the line of the low gate voltage VGL. For example, the seventh capacitor C7 may include a first electrode coupled to the second enable node GC_EN_NODE, and a second electrode coupled to the line of the low gate voltage VGL.

The second masking circuit 270 may separate (or disconnect) the second node QB from the fourth node GC_MQB when the voltage of the second enable node GC_EN_NODE has the first level, and may couple the second node QB to the fourth node GC_MQB when the voltage of the second enable node GC_EN_NODE has the second level.

In an embodiment, the second masking circuit 270 may include a twenty-seventh transistor T27 that selectively couples the second node QB to the fourth node GC_MQB in response to the voltage of the second enable node GC_EN_NODE. For example, the twenty-seventh transistor T27 may include a gate coupled to the second enable node GC_EN_NODE, a first terminal coupled to the second node QB, and a second terminal coupled to the fourth node GC_MQB.

In an embodiment, the second masking circuit 270 may further include an eighth capacitor C8 coupled between the line of the high gate voltage VGH and the fourth node GC_MQB, and twenty-eighth and twenty-ninth transistors T28 and T29 coupled to each other in series between the line of the high gate voltage VGH and the fourth node GC_MQB. The twenty-eighth transistor T28 may be turned on in response to the carry signal CR, and the twenty-ninth transistor T29 may be turned on in response to the second enable signal GC_EN. For example, the twenty-eighth transistor T28 may include a gate that receives the carry signal CR, a first terminal coupled to the line of the high gate voltage VGH, and a second terminal. For example, the twenty-ninth transistor T29 may include a gate that receives the second enable signal GC_EN, a first terminal coupled to the second terminal of the twenty-eighth transistor T28, and a second terminal coupled to the fourth node GC_MQB.

The second gate output circuit 280 may output the compensation gate signal GC having the first level while the voltage of the first node Q has the first level and the voltage of the third node GI_MQB has the second level. In an embodiment, the second gate output circuit 280 may include a thirtieth transistor T30 that outputs the high gate voltage VGH as the compensation gate signal GC in response to the voltage of the fourth node GC_MQB, and a thirty-first transistor T31 that outputs the low gate voltage VGL as the compensation gate signal GI in response to the voltage of the first node Q. For example, the thirtieth transistor T30 may include a gate coupled to the fourth node GC_MQB, a first terminal coupled to line of the high gate voltage VGH, and a second terminal coupled to a second gate output node GC_ON at which the compensation gate signal GC is output. For example, the thirty-first transistor T31 may include a gate coupled to the first node Q, a first terminal coupled to the second gate output node GC_ON, and a second terminal coupled to the line of the low gate voltage VGL.

In an embodiment, the first through thirty-first transistors T1 through T31 included in each stage 200 may be implemented with, but not limited to, p-type metal-oxide-semiconductor (PMOS) transistors. In other embodiments, a portion or all of the first through thirty-first transistors T1 through T31 may be implemented with, but not limited to, n-type metal-oxide-semiconductor (NMOS) transistors. Even if the first through thirty-first transistors T1 through T31 are implemented with the PMOS transistors, each stage 200 of the gate driver according to embodiments may generate the carry signal CR, the initialization gate signal GI and the compensation gate signal GC that are the active high signals having the high level as the active level.

In an embodiment, the second enable node controlling circuit 260, the second masking circuit 270 and the second gate output circuit 280 may have substantially the same configuration and operation as the first enable node controlling circuit 230, the first masking circuit 240 and the first gate output circuit 250. Thus, output timings of the initialization gate signal GI and the compensation gate signal GC output from each stage 200 may be substantially the same as each other.

In an embodiment of the stage 200 having the above configuration, in a case where the first enable signal GI_EN has the first level before the carry signal CR having the first level is output, the first enable node controlling circuit 230 may control the voltage of the first enable node GI_EN_NODE to have the second level. While the carry signal CR having the first level is output, the first masking circuit 240 may control the voltage of the third node GI_MQB to have a level of the voltage of the second node QB, or to have the second level, in response to the voltage of the first enable node GI_EN_NODE having the second level. The first gate output circuit 250 may output the initialization gate signal GI having the first level in response to the voltage of the third node GI_MQB having the second level. Even if the level of the first enable signal GI_EN is changed from the first level to the second level while the carry signal CR having the first level is output, the first enable node controlling circuit 230 may hold the voltage of the first enable node GI_EN_NODE as the second level until outputting the carry signal CR having the first level is completed. Accordingly, the initialization gate signal GI, an active period of which has a time length corresponding to two or more horizontal times, may be normally output.

In such an embodiment, in the stage 200, in a case where the first enable signal GI_EN has the second level before the carry signal CR having the first level is output, the first enable node controlling circuit 230 may control the voltage of the first enable node GI_EN_NODE have to the first level. While the carry signal CR having the first level is output, the first masking circuit 240 may control the voltage of the third node GI_MQB have to the first level different from the level of the second node QB in response to the voltage of the first enable node GI_EN_NODE having the first level. The first gate output circuit 250 may not output the initialization gate signal GI having the first level in response to the voltage of the third node GI_MQB having the first level. Even if the level of the first enable signal GI_EN is changed from the second level to the first level while the carry signal CR having the first level is output, the first enable node controlling circuit 230 may hold the voltage of the first enable node GI_EN_NODE as the first level until outputting the carry signal CR having the first level is completed. Accordingly, the initialization gate signal GI having the first level may be effectively prevented from being undesirably output by a level change of the first enable signal GI_EN.

In the stage 200, in a case where the second enable signal GC_EN has the first level before the carry signal CR having the first level is output, the second enable node controlling circuit 260 may control the voltage of the second enable node GC_EN_NODE to have the second level. While the carry signal CR having the first level is output, the second masking circuit 270 may control the voltage of the fourth node GC_MQB to have a level of the voltage of the second node QB, or to have the second level, in response to the voltage of the second enable node GC_EN_NODE having the second level. The second gate output circuit 280 may output the compensation gate signal GC having the first level in response to the voltage of the fourth node GC_MQB having the second level. Even if the level of the second enable signal GC_EN is changed from the first level to the second level while the carry signal CR having the first level is output, the second enable node controlling circuit 260 may hold the voltage of the second enable node GC_EN_NODE as the second level until outputting the carry signal CR having the first level is completed. Accordingly, the compensation gate signal GC, an active period of which has a time length corresponding to two or more horizontal times, may be normally output.

In such an embodiment, in the stage 200, in a case where the second enable signal GC_EN has the second level before the carry signal CR having the first level is output, the second enable node controlling circuit 260 may control the voltage of the second enable node GC_EN_NODE to have the first level. While the carry signal CR having the first level is output, the second masking circuit 270 may control the voltage of the fourth node GC_MQB to have the first level different from the level of the second node QB in response to the voltage of the second enable node GC_EN_NODE having the first level. The second gate output circuit 280 may not output the compensation gate signal GC having the first level in response to the voltage of the fourth node GC_MQB having the first level. Even if the level of the second enable signal GC_EN is changed from the second level to the first level while the carry signal CR having the first level is output, the second enable node controlling circuit 260 may hold the voltage of the second enable node GC_EN_NODE as the first level until outputting the carry signal CR having the first level is completed. Accordingly, the compensation gate signal GC having the first level may be effectively prevented from being undesirably output by a level change of the second enable signal GC_EN.

Figure 5:
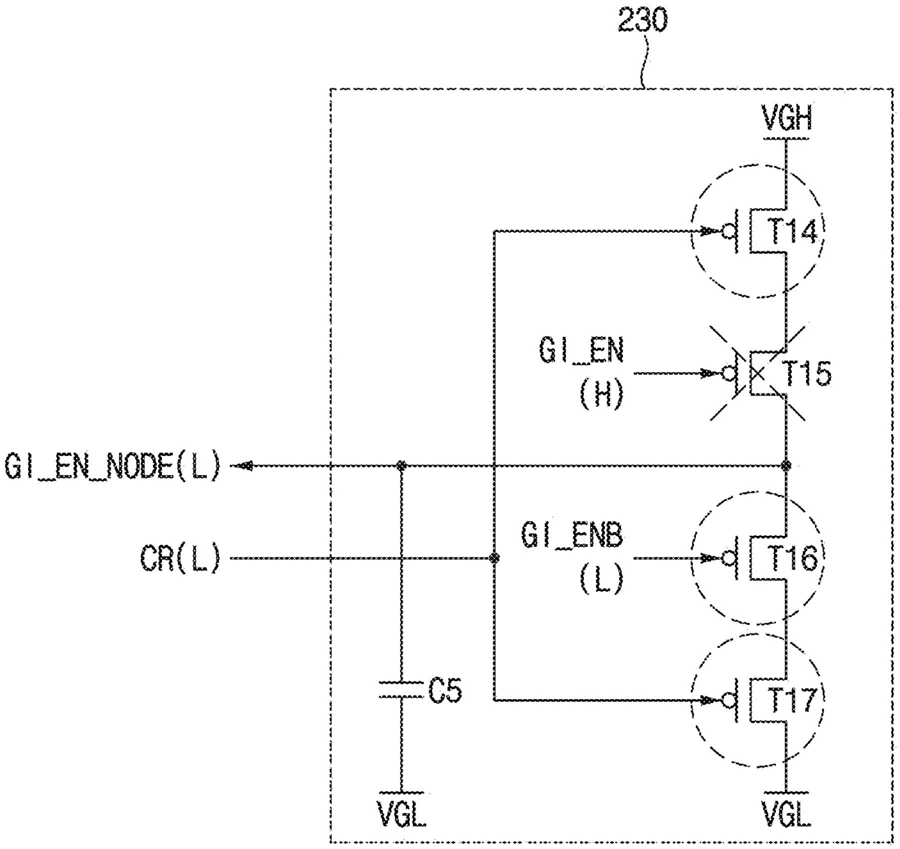
FIG. 5 is a circuit diagram for describing an operation of a first enable node controlling circuit in a first time period.
Figure 6:
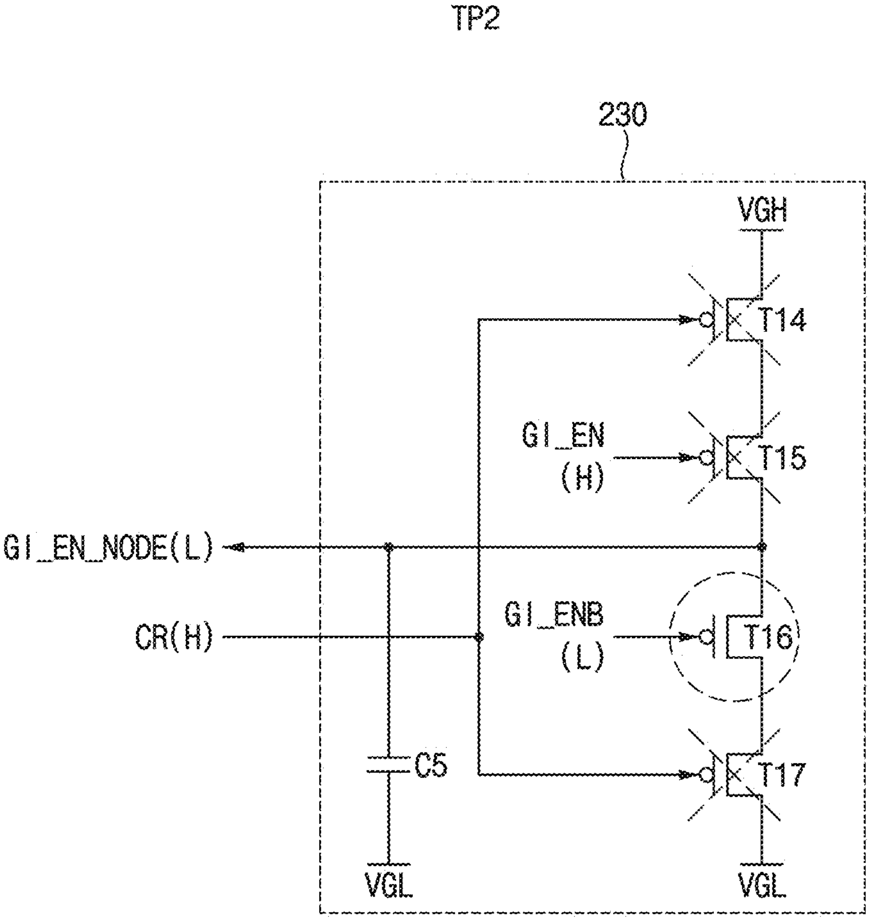
FIG. 6 is a circuit diagram for describing an operation of a first enable node controlling circuit in a second time period.
Figure 7:
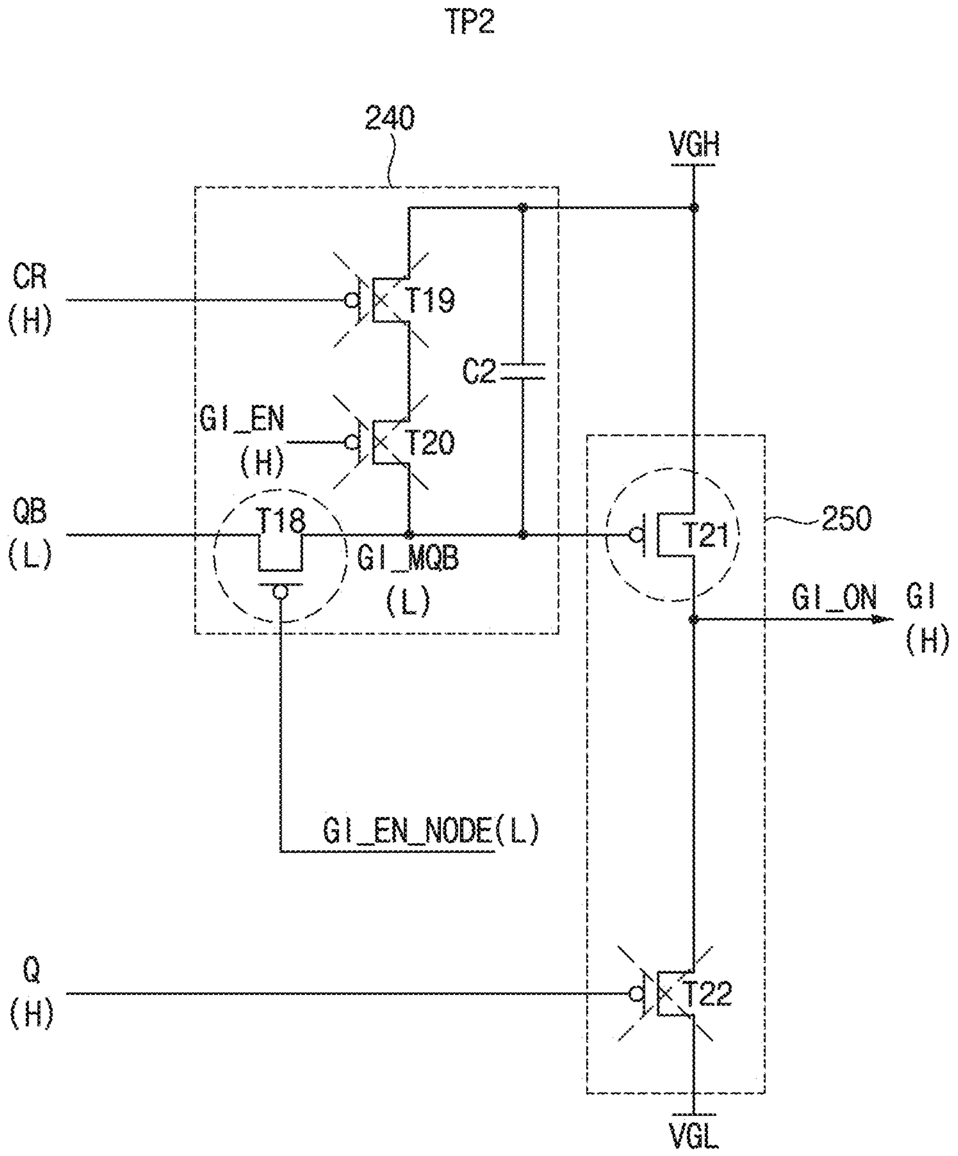
FIG. 7 is a circuit diagram for describing operations of a first masking circuit and a first gate output circuit in a second time period.

FIG. 4 is a timing diagram for describing an example of an operation of a stage of FIG. 3 when a first enable signal has a first level. FIG. 5 is a circuit diagram for describing an operation of a first enable node controlling circuit in a first time period. FIG. 6 is a circuit diagram for describing an operation of a first enable node controlling circuit in a second time period. FIG. 7 is a circuit diagram for describing operations of a first masking circuit and a first gate output circuit in a second time period.

Referring to FIGS. 3 and 4, while an input signal FLM/PCR having a high level H is not received, and a carry signal CR having the high level H is not output, a control circuit 210 may control a voltage of a first node Q to have a lower level (or a level lower than the low level L), and may control a voltage of a second node QB to have the high level H. Accordingly, a carry output circuit 220 may output the carry signal CR having the low level L in response to the voltage of the first node Q having the lower level, and a first gate output circuit 250 may output a initialization gate signal GI having the low level L in response to the voltage of the first node Q having the lower level.

In a first time period TP1, the input signal FLM/PCR having the high level H may be received, and a first clock signal CLK1 may have the low level L. The control circuit 210 may apply the input signal FLM/PCR having the high level H to the first node Q in response to the first clock signal CLK1 having the low level L. Thus, the voltage of the first node Q may have the high level H.

Further, in the first time period TP1, in a case where a first enable signal GI_EN has the high level H and a first inverted enable signal GI_ENB has the low level L, a first enable node controlling circuit 230 may control a voltage of a first enable node GI_EN_NODE to have the low level L. For example, as illustrated in FIG. 5, fourteenth and seventeenth transistors T14 and T17 may be turned on in response to the carry signal CR having the low level L, a fifteenth transistor T15 may be turned off in response to the first enable signal GI_EN having the high level H, and a sixteenth transistor T16 may be turned on in response to the first inverted enable signal GI_ENB having the low level L. Thus, the sixteenth and seventeenth transistors T16 and T17 may apply a low gate voltage VGL to the first enable node GI_EN_NODE, and the voltage of the first enable node GI_EN_NODE may have the low level L.

In a second time period TP2 after the first time period TP1, the control circuit 210 may control the voltage of the second node QB to have the low level L in response to a second clock signal CLK2 having the low level L. For example, sixth and seventh transistors T6 and T7 may apply the second clock signal CLK2 having the low level L to the second node QB in response to the second clock signal CLK2 having the low level L. The carry output circuit 220 may output the carry signal CR having the high level H in response to the voltage of the second node QB having the low level L.

Further, in the second time period TP2, the first enable node controlling circuit 230 may hold the voltage of the first enable node GI_EN_NODE as the low level L. For example, as illustrated in FIG. 6, the fourteenth and seventeenth transistors T14 and T17 may be turned off in response to the carry signal CR having the high level H, the fifteenth transistor T15 may be turned off in response to the first enable signal GI_EN having the high level H, and the sixteenth transistor T16 may be turned on in response to the first inverted enable signal GI_ENB having the low level L. Thus, a high gate voltage VGH and the low gate voltage VGL may not be applied to the first enable node GI_EN_NODE, and a fifth capacitor C5 may hold the voltage of the first enable node GI_EN_NODE to a previous level, or the low level L.

Further, in the second time period TP2, a first masking circuit 240 may control a voltage of a third node GI_MQB to have the low level L by coupling the second node QB to the third node GI_MQB in response to the voltage of the first enable node GI_EN_NODE having the low level L, and the first gate output circuit 250 may output the initialization gate signal GI having the high level H in response to the voltage of the third node GI_MQB having the low level L. For example, as illustrated in FIG. 7, an eighteenth transistor T18 may couple the second node QB to the third node GI_MQB in response to the voltage of the first enable node GI_EN_NODE having the low level L, and thus the voltage of the third node GI_MQB may have the level of the voltage of the second node QB, or the low level L. Further, a nineteenth transistor T19 may be turned off in response to the carry signal CR having the high level H, and a twentieth transistor T20 may be turned off in response to the first enable signal GI_EN having the high level H. In addition, a twenty-first transistor T21 may be turned on in response to the voltage of the third node GI_MQB having the low level L, and a twenty-second transistor T22 may be turned off in response to the voltage of the first node Q having the high level H. The twenty-first transistor T21 may apply the high gate voltage VGH to a first gate output node GI_ON, and thus the initialization gate signal GI having the high level H may be output at the first gate output node GI_ON.

In an embodiment, as described above, in a case where the first enable signal GI_EN has the high level H at a time point at which outputting the carry signal CR having the high level H is initiated, or at an end time point of the first period TP1 or a start time point of the second period TP2, a stage 200 may output the initialization gate signal GI having the high level H.

Figure 8:
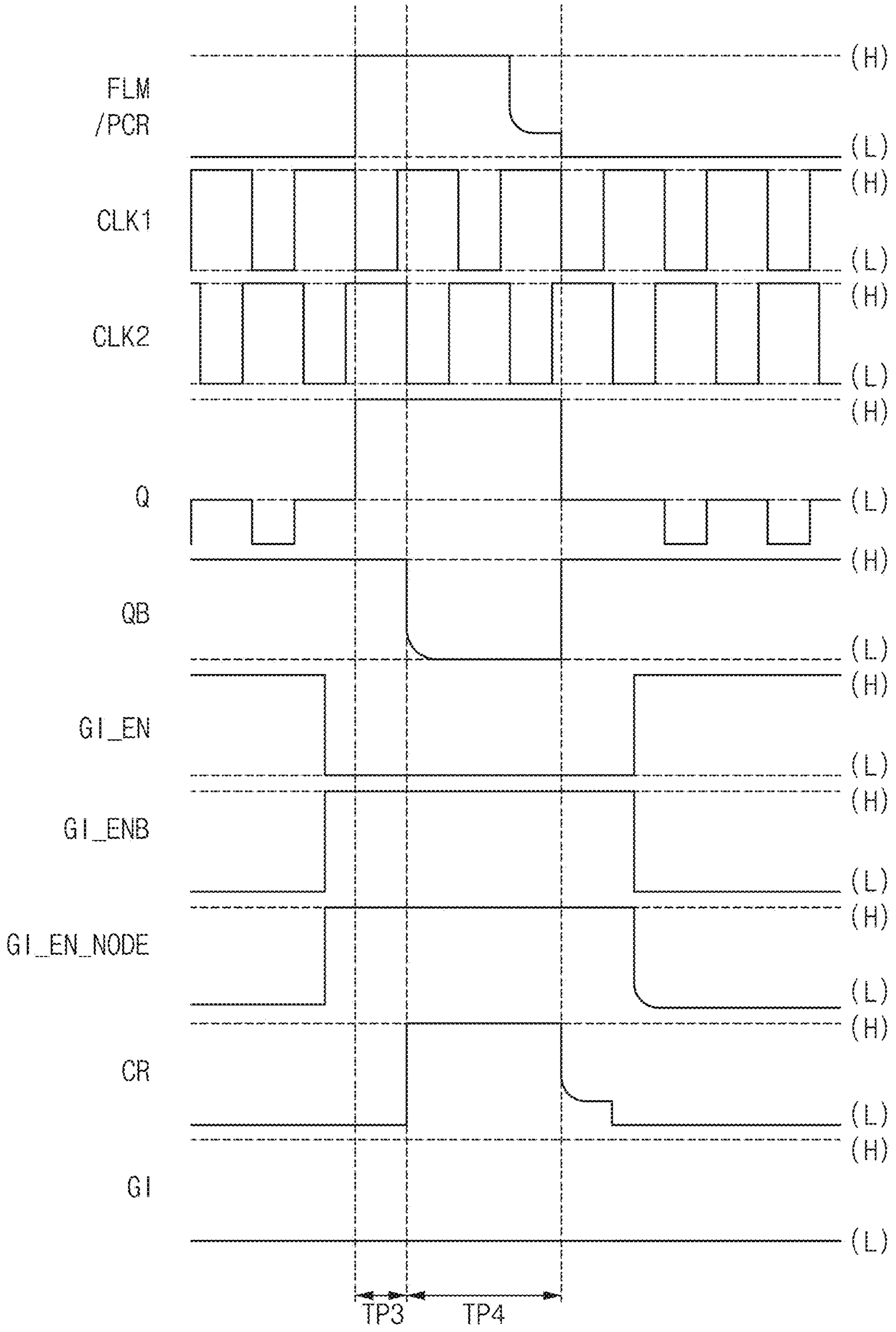
FIG. 8 is a timing diagram for describing an example of an operation of a stage of FIG. 3 when a first enable signal has a second level.
Figure 9:
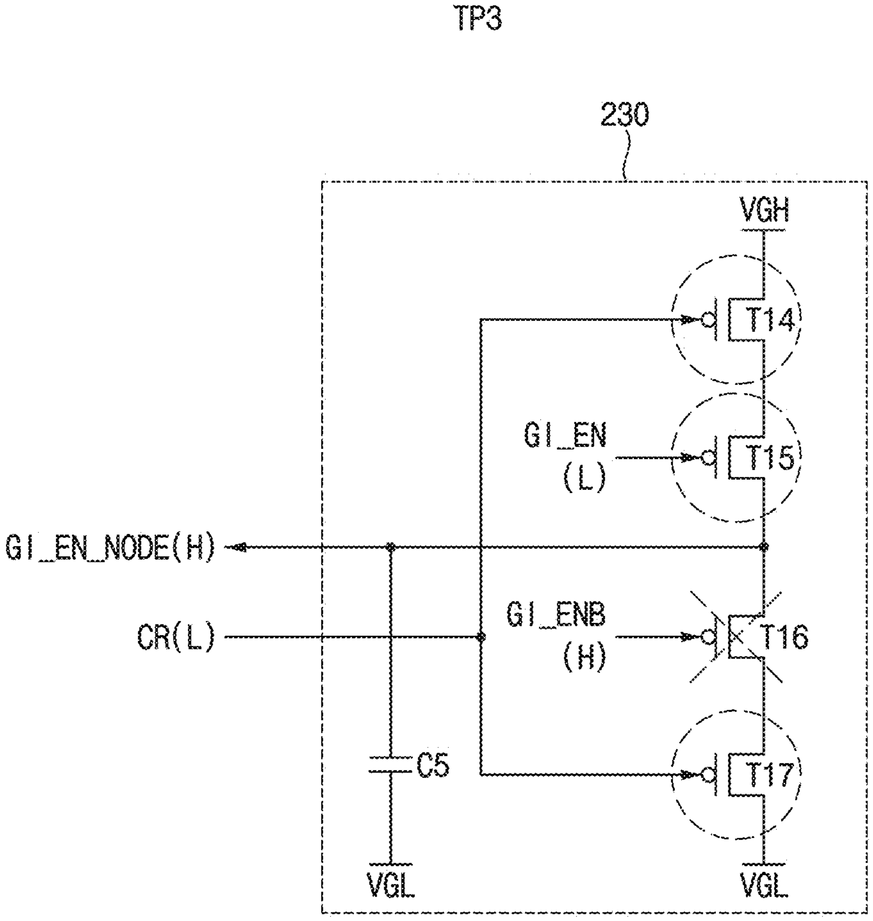
FIG. 9 is a circuit diagram for describing an operation of a first enable node controlling circuit in a third time period.
Figure 10:
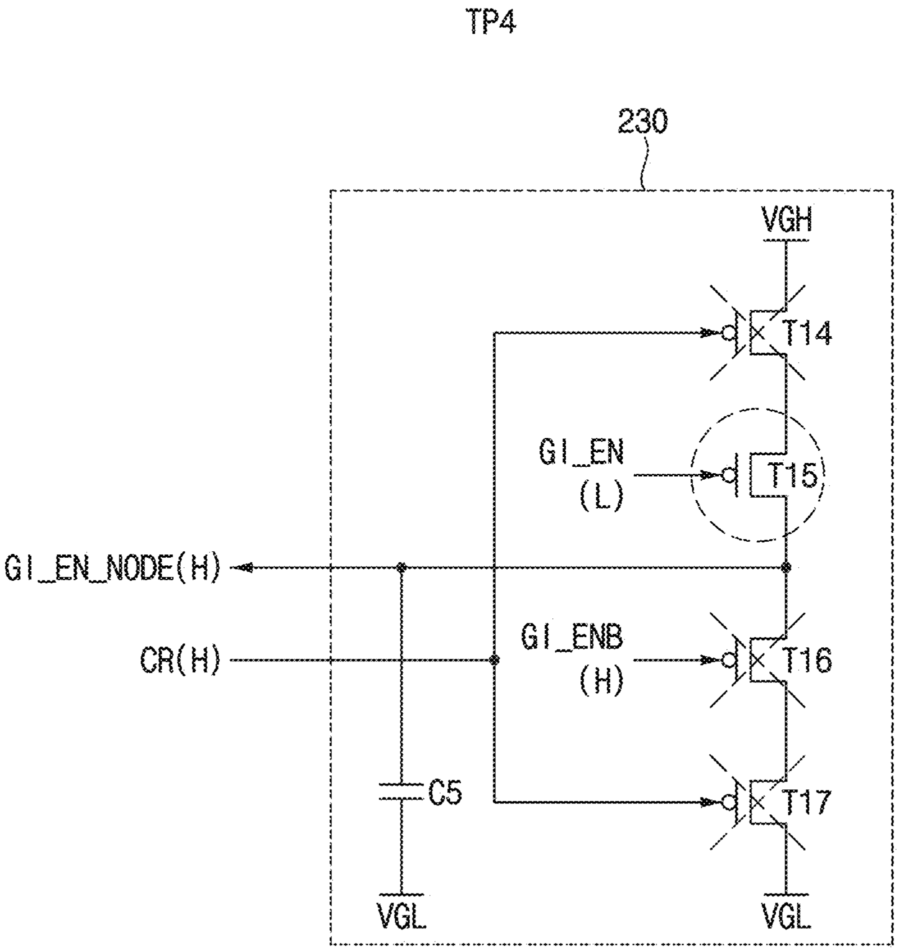
FIG. 10 is a circuit diagram for describing an operation of a first enable node controlling circuit in a fourth time period.
Figure 11:
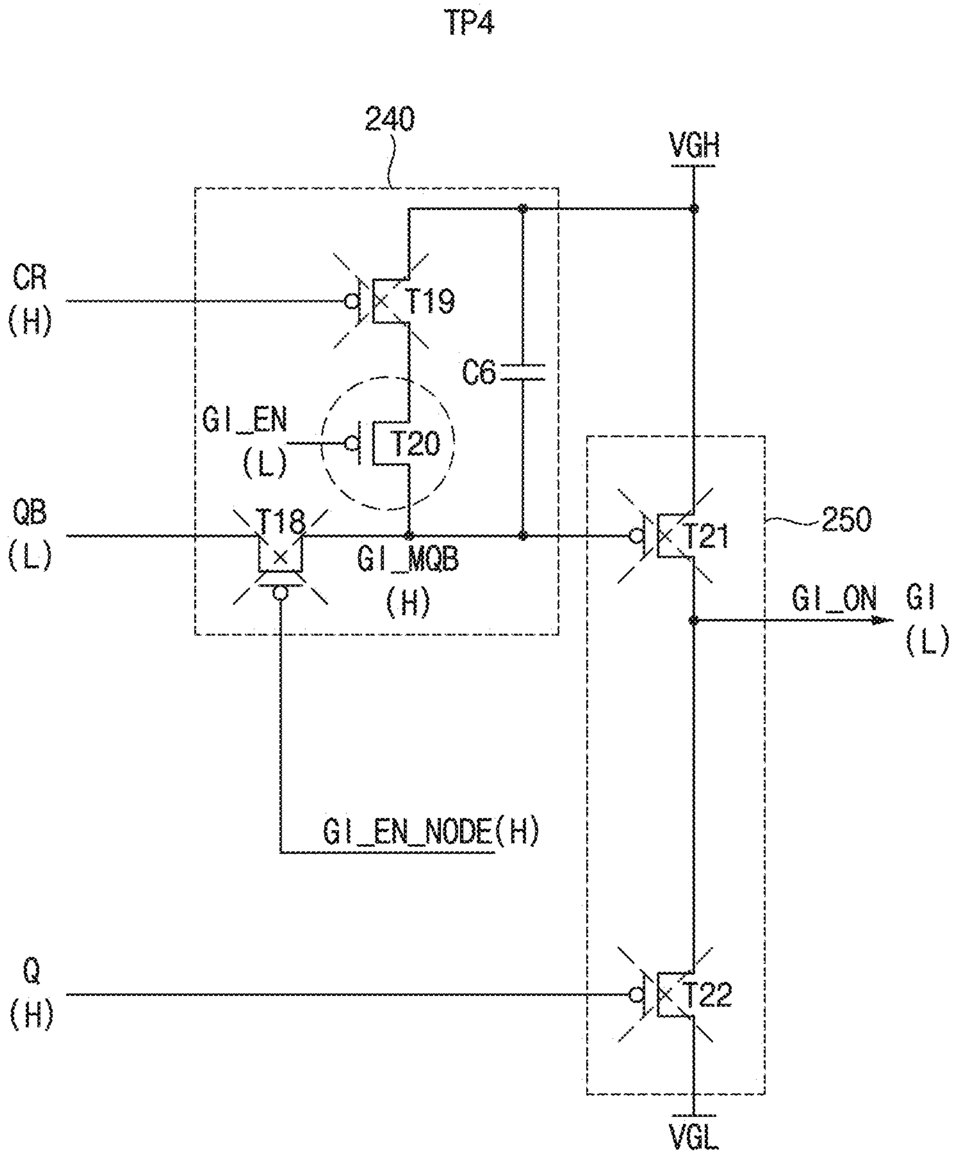
FIG. 11 is a circuit diagram for describing operations of a first masking circuit and a first gate output circuit in a fourth time period.

FIG. 8 is a timing diagram for describing an example of an operation of a stage of FIG. 3 when a first enable signal has a second level. FIG. 9 is a circuit diagram for describing an operation of a first enable node controlling circuit in a third time period. FIG. 10 is a circuit diagram for describing an operation of a first enable node controlling circuit in a fourth time period. FIG. 11 is a circuit diagram for describing operations of a first masking circuit and a first gate output circuit in a fourth time period.

Referring to FIGS. 3 and 8, in a third time period TP3, an input signal FLM/PCR having a high level H may be received, and a first clock signal CLK1 may have a low level L. A control circuit 210 may apply the input signal FLM/PCR having the high level H to a first node Q in response to the first clock signal CLK1 having the low level L. Thus, a voltage of the first node Q may have the high level H.

Further, in the third time period TP3, in a case where a first enable signal GI_EN has the low level L and a first inverted enable signal GI_ENB has the high level H, a first enable node controlling circuit 230 may control a voltage of a first enable node GI_EN_NODE to have the high level H. For example, as illustrated in FIG. 9, fourteenth and seventeenth transistors T14 and T17 may be turned on in response to a carry signal CR having the low level L, a fifteenth transistor T15 may be turned on in response to the first enable signal GI_EN having the low level L, and a sixteenth transistor T16 may be turned off in response to the first inverted enable signal GI_ENB having the high level H. Thus, the fourteenth and fifteenth transistors T14 and T15 may apply a high gate voltage VGH to the first enable node GI_EN_NODE, and the voltage of the first enable node GI_EN_NODE may have the high level H.

In a fourth time period TP4 after the third time period TP3, the control circuit 210 may control a voltage of a second node QB to have the low level L in response to a second clock signal CLK2 having the low level L. A carry output circuit 220 may output the carry signal CR having the high level H in response to the voltage of the second node QB having the low level L.

Further, in the fourth time period TP4, the first enable node controlling circuit 230 may hold the voltage of the first enable node GI_EN_NODE as the high level H. For example, as illustrated in FIG. 10, the fourteenth and seventeenth transistors T14 and T17 may be turned off in response to the carry signal CR having the high level H, the fifteenth transistor T15 may be turned on in response to the first enable signal GI_EN having the low level L, and the sixteenth transistor T16 may be turned off in response to the first inverted enable signal GI_ENB having the high level H. Thus, the high gate voltage VGH and a low gate voltage VGL may not be applied to the first enable node GI_EN_NODE, and a fifth capacitor C5 may hold the voltage of the first enable node GI_EN_NODE to a previous level, or the high level H.

Further, in the fourth time period TP4, a first masking circuit 240 may control a voltage of a third node GI_MQB to have the high level H by separating the second node QB from the third node GI_MQB in response to the voltage of the first enable node GI_EN_NODE having the high level H, and a first gate output circuit 250 may not output a initialization gate signal GI having the high level H in response to the voltage of the third node GI_MQB having the high level H. For example, as illustrated in FIG. 11, an eighteenth transistor T18 may separate (or disconnect) the second node QB from the third node GI_MQB in response to the voltage of the first enable node GI_EN_NODE having the high level H, and thus the voltage of the third node GI_MQB may be held or maintained as a previous level, or the high level H. Further, a nineteenth transistor T19 may be turned off in response to the carry signal CR having the high level H, and a twentieth transistor T20 may be turned on in response to the first enable signal GI_EN having the low level L. In addition, a twenty-first transistor T21 may be turned off in response to the voltage of the third node GI_MQB having the high level H, and a twenty-second transistor T22 may be turned off in response to the voltage of the first node Q having the high level H. Thus, a voltage of a first gate output node GI_ON may be held or maintained as a previous level, or the low level L, and the initialization gate signal GI having the high level H may not be output at the first gate output node GI_ON.

In an embodiment, as described above, in a case where the first enable signal GI_EN has the low level L at a time point at which outputting the carry signal CR having the high level H is initiated, or at an end time point of the third period TP3 or a start time point of the fourth period TP4, a stage 200 may not output the initialization gate signal GI having the high level H.

Figure 12:
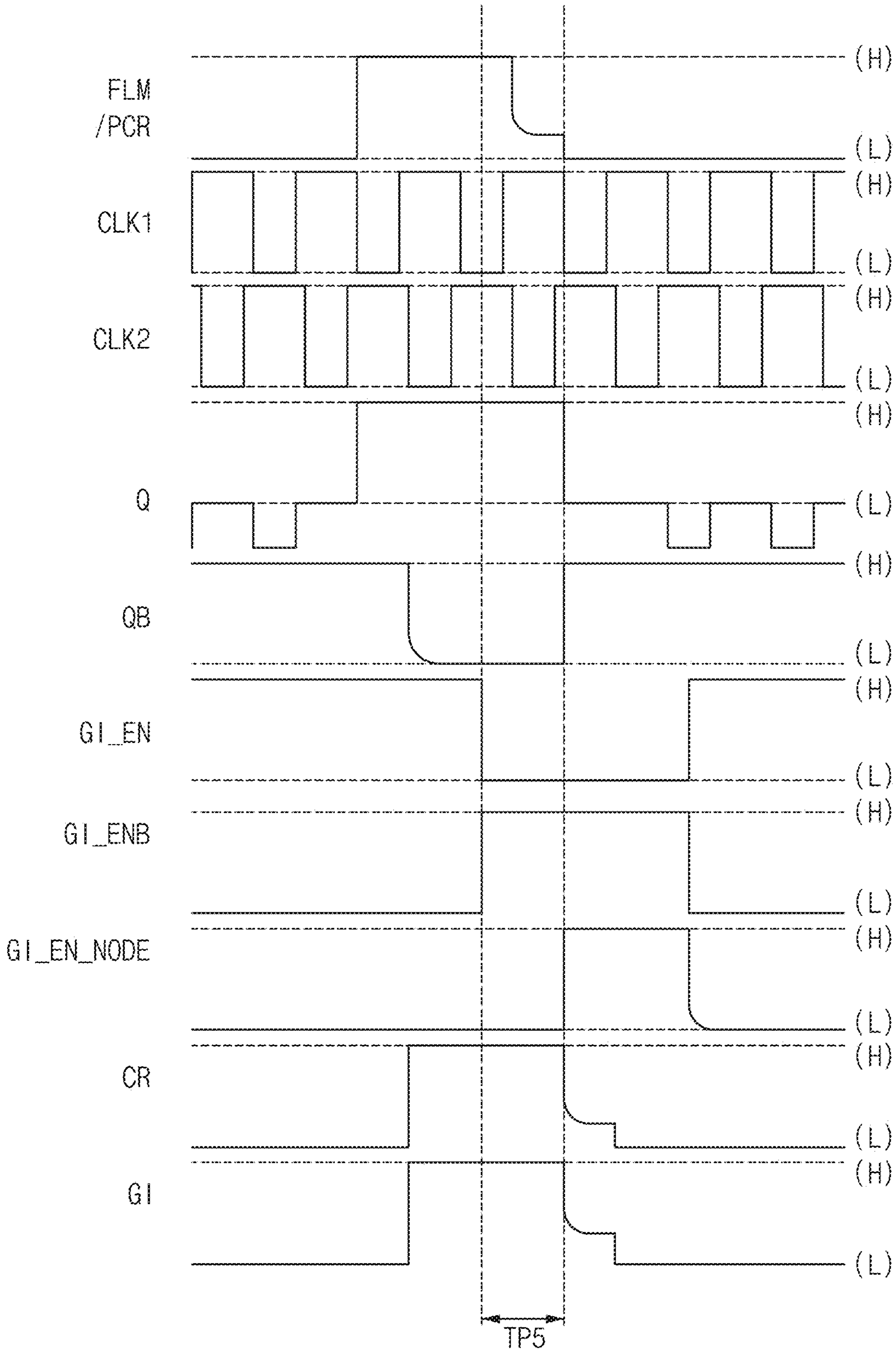
FIG. 12 is a timing diagram for describing an example of an operation of a stage of FIG. 3 when a level of a first enable signal is changed from a first level to a second level while a carry signal is output.
Figure 13:
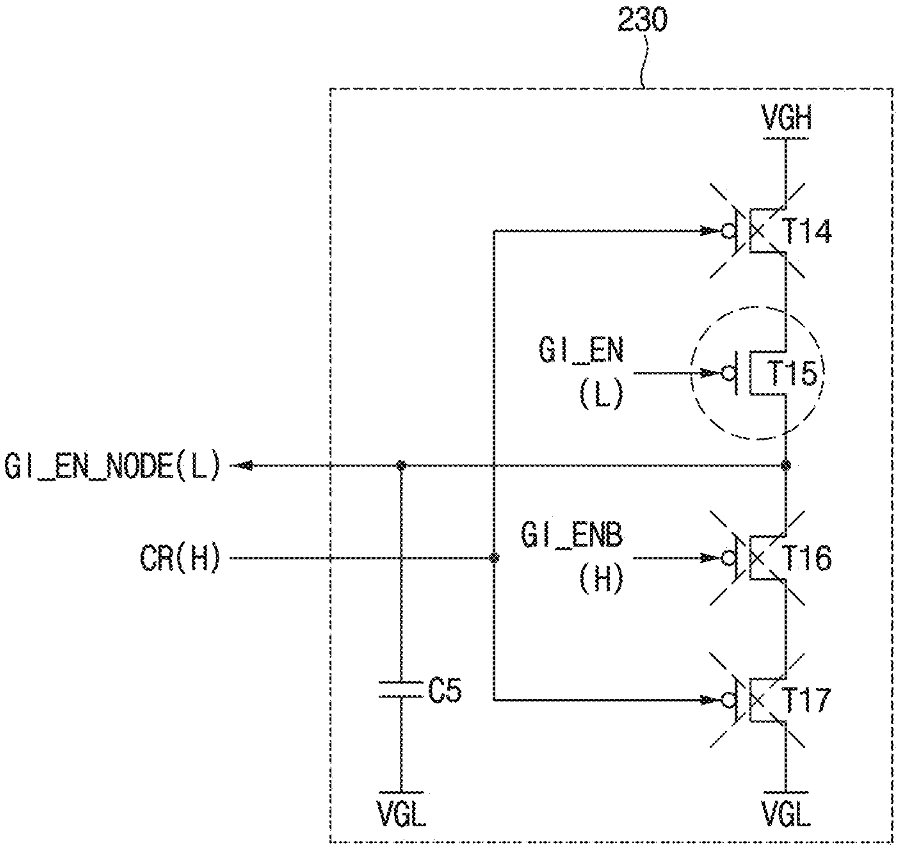
FIG. 13 is a circuit diagram for describing an operation of a first enable node controlling circuit in a fifth time period.
Figure 14:
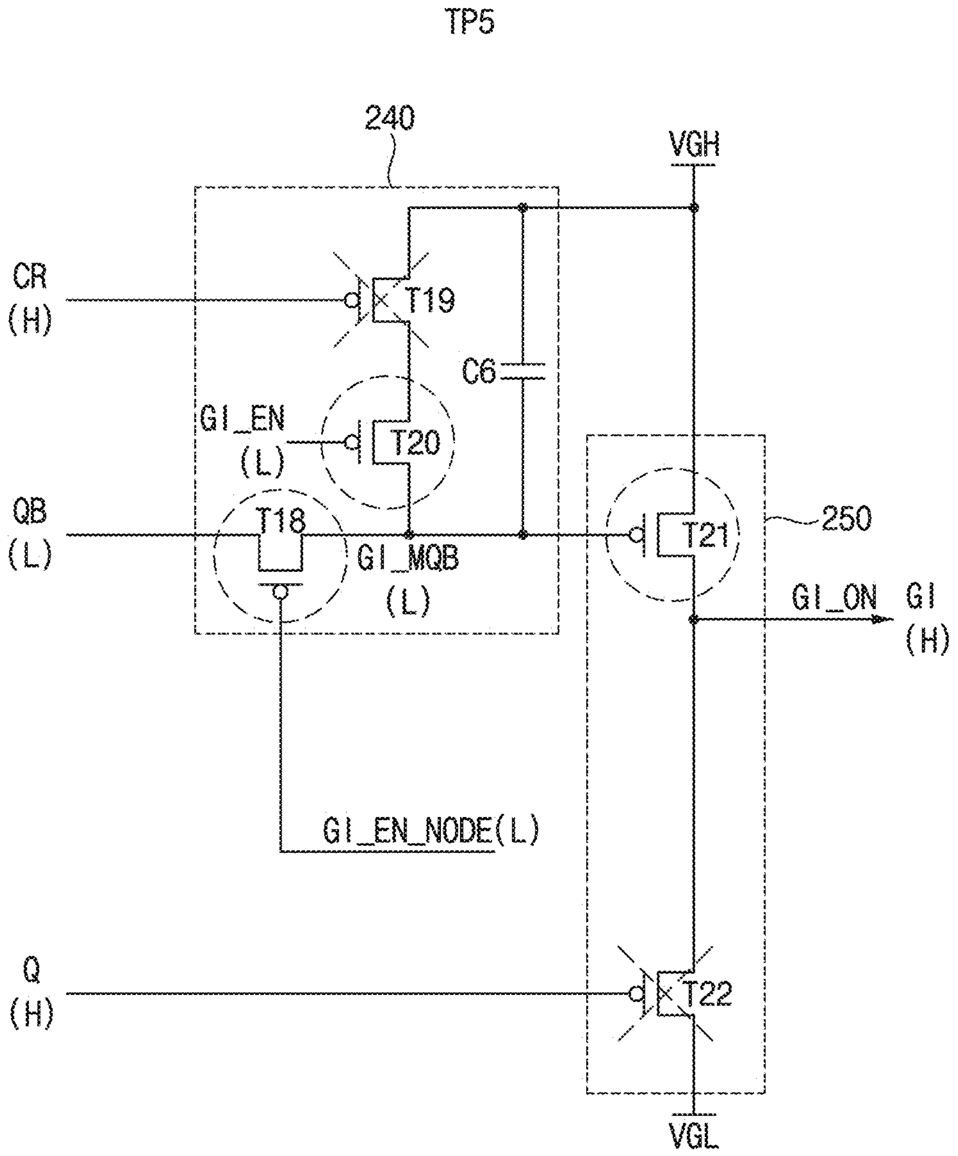
FIG. 14 is a circuit diagram for describing operations of a first masking circuit and a first gate output circuit in a fifth time period.

FIG. 12 is a timing diagram for describing an example of an operation of a stage of FIG. 3 when a level of a first enable signal is changed from a first level to a second level while a carry signal is output. FIG. 13 is a circuit diagram for describing an operation of a first enable node controlling circuit in a fifth time period. FIG. 14 is a circuit diagram for describing operations of a first masking circuit and a first gate output circuit in a fifth time period.

A timing diagram of FIG. 12 may be similar to a timing diagram of FIG. 4, except that, while a carry signal CR having a high level His output, a level of a first enable signal GI_EN is changed from the high level H to a low level L, and a level of a first inverted enable signal GI_ENB is changed from the low level L to the high level H.

Referring to FIGS. 3 and 12, in a fifth time period TP5, during which the carry signal CR has the high level H, the first enable signal GI_EN has the low level L, and the first inverted enable signal GI_ENB has the high level H, a first enable node controlling circuit 230 may hold a voltage of a first enable node GI_EN_NODE as the low level L. For example, as illustrated in FIG. 13, fifteenth and seventeenth transistors T14 and T17 may be turned off in response to the carry signal CR having the high level H, a fifteenth transistor T15 may be turned on in response to the first enable signal GI_EN having the low level L, and a sixteenth transistor T16 may be turned off in response to the first inverted enable signal GI_ENB having the high level H. That is, even if the fifteenth transistor T15 is turned on by the first enable signal GI_EN having a level changed from the high level H to the low level L, since the fourteenth and fifteenth transistors T14 and T15 are turned off, a high gate voltage VGH and a low gate voltage VGL may not be applied to the first enable node GI_EN_NODE, and a fifth capacitor C5 may hold the voltage of the first enable node GI_EN_NODE to have a previous level, or the low level L.

Further, in the fifth time period TP5, a first masking circuit 240 may control a voltage of a third node GI_MQB to have the low level L by coupling a second node QB to the third node GI_MQB in response to the voltage of the first enable node GI_EN_NODE having the low level L, and a first gate output circuit 250 may output a initialization gate signal GI having the high level H in response to the voltage of the third node GI_MQB having the low level L. For example, as illustrated in FIG. 14, an eighteenth transistor T18 may couple the second node QB to the third node GI_MQB in response to the voltage of the first enable node GI_EN_NODE having the low level L, and thus the voltage of the third node GI_MQB may have the level of the voltage of the second node QB, or the low level L. Further, a nineteenth transistor T19 may be turned off in response to the carry signal CR having the high level H, and a twentieth transistor T20 may be turned on in response to the first enable signal GI_EN having the low level L. In addition, a twenty-first transistor T21 may be turned on in response to the voltage of the third node GI_MQB having the low level L, and a twenty-second transistor T22 may be turned off in response to a voltage of a first node Q having the high level H. The twenty-first transistor T21 may apply the high gate voltage VGH to a first gate output node GI_ON, and thus the initialization gate signal GI having the high level H may be output at the first gate output node GI_ON.

In an embodiment, as described above, even if the voltage level of the first enable signal GI_EN is changed from the high level H to the low level L while the carry signal CR having the high level H is output, a stage 200 may continue outputting the initialization gate signal GI having the high level H.

Figure 15:
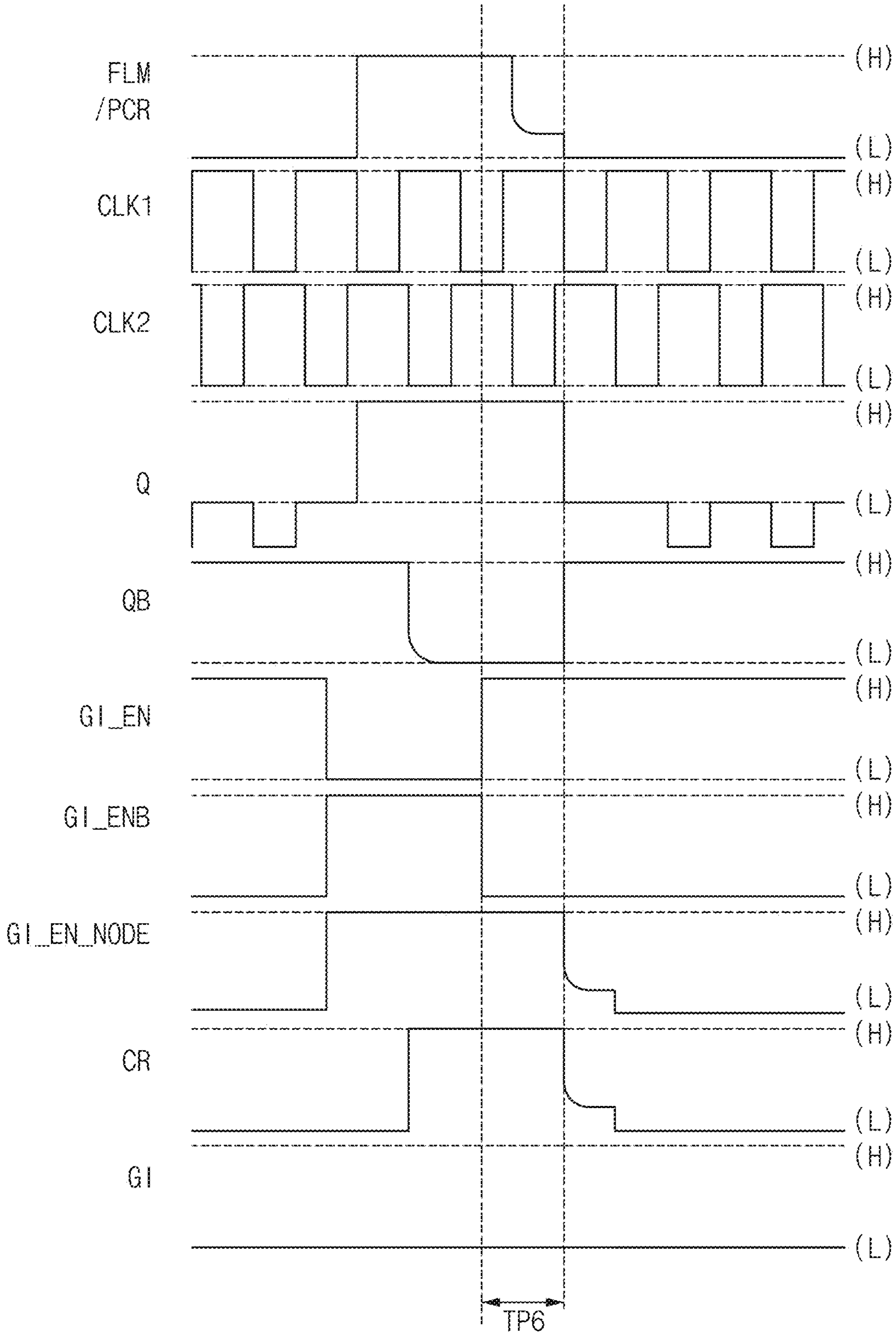
FIG. 15 is a timing diagram for describing an example of an operation of a stage of FIG. 3 when a level of a first enable signal is changed from a second level to a first level while a carry signal is output.
Figure 16:
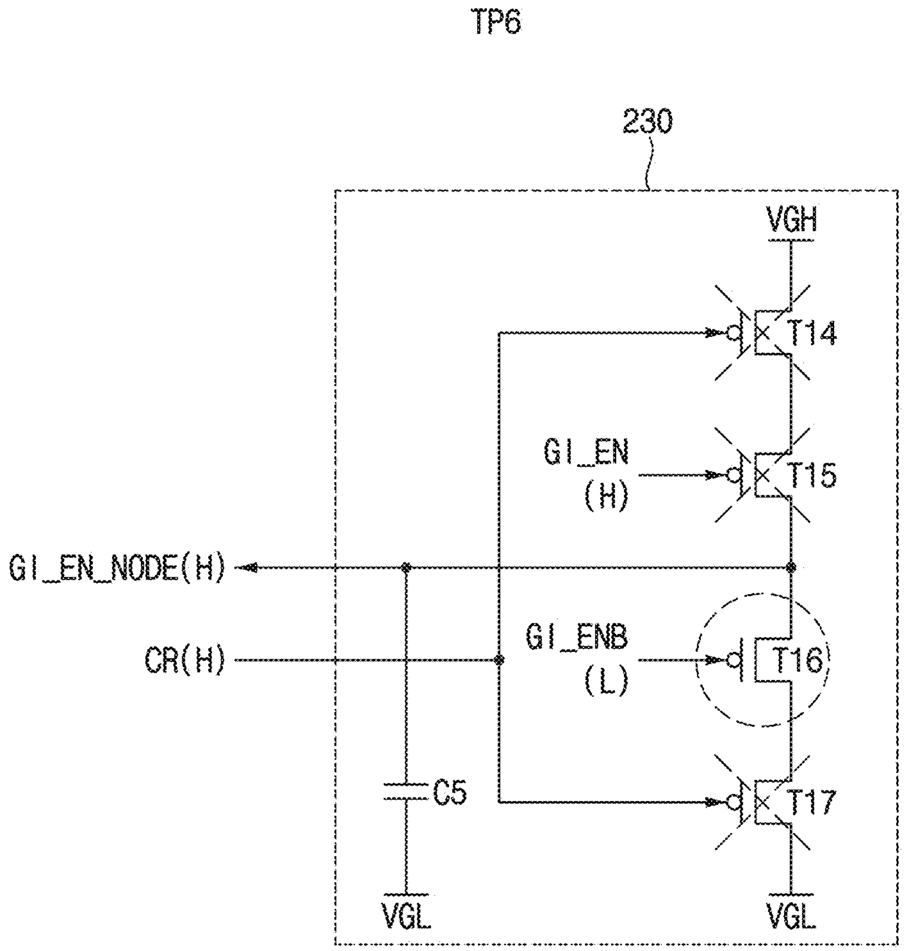
FIG. 16 is a circuit diagram for describing an operation of a first enable node controlling circuit in a sixth time period.
Figure 17:
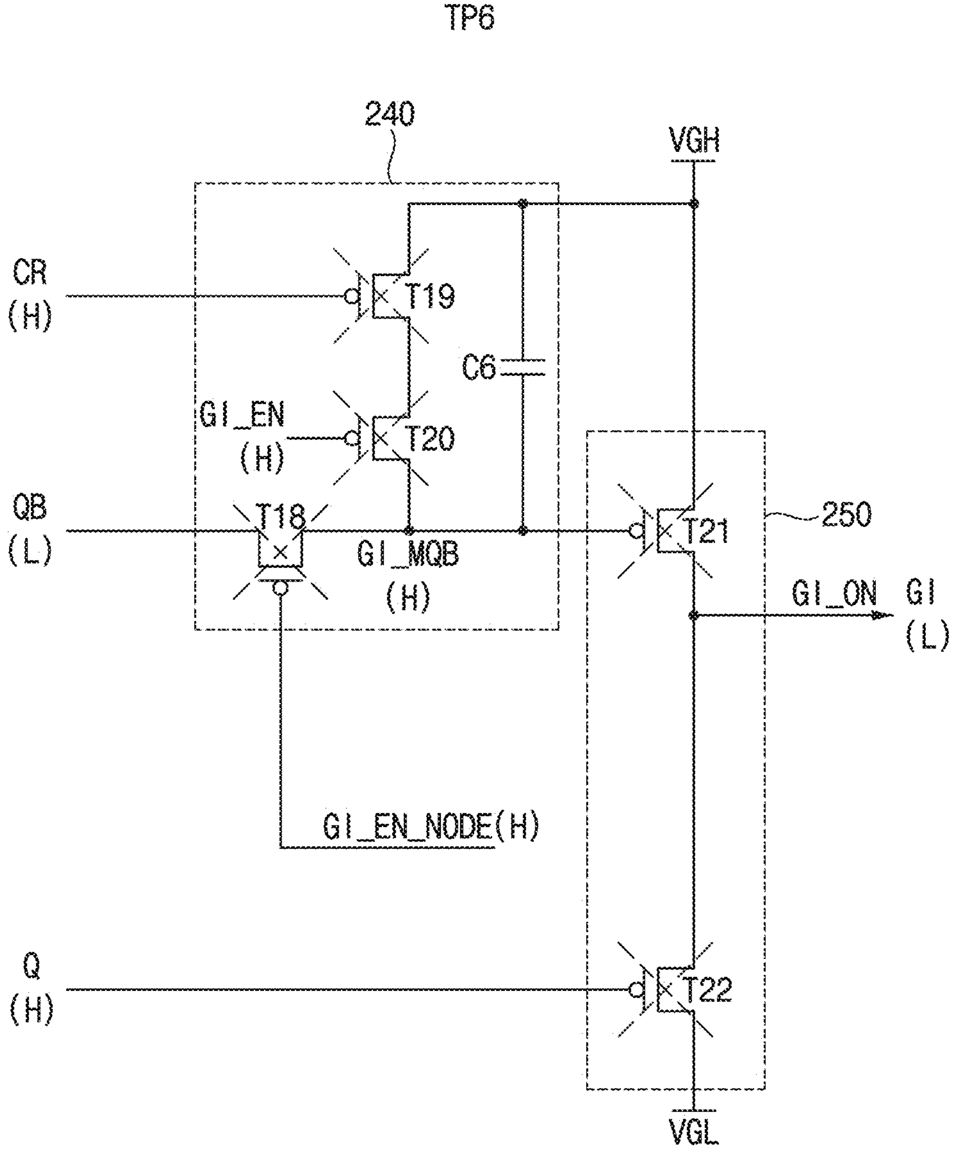
FIG. 17 is a circuit diagram for describing operations of a first masking circuit and a first gate output circuit in a sixth time period.

FIG. 15 is a timing diagram for describing an example of an operation of a stage of FIG. 3 when a level of a first enable signal is changed from a second level to a first level while a carry signal is output. FIG. 16 is a circuit diagram for describing an operation of a first enable node controlling circuit in a sixth time period. FIG. 17 is a circuit diagram for describing operations of a first masking circuit and a first gate output circuit in a sixth time period.

A timing diagram of FIG. 15 may be similar to a timing diagram of FIG. 8, except that, while a carry signal CR having a high level His output, a level of a first enable signal GI_EN is changed from a low level L to the high level H, and a level of a first inverted enable signal GI_ENB is changed from the high level H to the low level L.

Referring to FIGS. 3 and 15, in a sixth time period TP6 in which the carry signal CR having the high level H is output, the first enable signal GI_EN has the high level H, and the first inverted enable signal GI_ENB has the low level L, a first enable controlling control circuit 230 may hold a voltage of a first enable node GI_EN_NODE as the hold level H. For example, as illustrated in FIG. 16, fourteenth and seventeenth transistors T14 and T17 may be turned off in response to the carry signal CR having the high level H, a fifteenth transistor T15 may be turned off in response to the first enable signal GI_EN having the high level H, and a sixteenth transistor T16 may be turned on in response to the first inverted enable signal GI_ENB having the low level L. That is, even if the sixteenth transistor T16 is turned on by the first inverted enable signal GI_ENB having a level changed from the high level H to the low level L, since the fourteenth and seventeenth transistors T14 and T17 are turned off, a high gate voltage VGH and a low gate voltage VGL may not be applied to the first enable node GI_EN_NODE, and a fifth capacitor C5 may hold the voltage of the first enable node GI_EN_NODE to a previous level, or the high level H.

Further, in the sixth time period TP6, a first masking circuit 240 may control a voltage of a third node GI_MQB to have the high level H by separating a second node QB from the third node GI_MQB in response to the voltage of the first enable node GI_EN_NODE having the high level H, and a first gate output circuit 250 may not output a initialization gate signal GI having the high level H in response to the voltage of the third node GI_MQB having the high level H. For example, as illustrated in FIG. 17, an eighteenth transistor T18 may separate (or disconnect) the second node QB from the third node GI_MQB in response to the voltage of the first enable node GI_EN_NODE having the high level H, and thus the voltage of the third node GI_MQB may be held or maintained as a previous level, or the high level H.

Further, a nineteenth transistor T19 may be turned off in response to the carry signal CR having the high level H, and a twentieth transistor T20 may be turned off in response to the first enable signal GI_EN having the high level H. In addition, a twenty-first transistor T21 may be turned off in response to the voltage of the third node GI_MQB having the high level H, and a twenty-second transistor T22 may be turned off in response to a voltage of a first node Q having the high level H. Thus, a voltage of a first gate output node GI_ON may be held or maintained as a previous level, or the low level L, and the initialization gate signal GI having the high level H may not be output at the first gate output node GI_ON.

In an embodiment, as described above, even if the level of the first enable signal GI_EN is changed from the low level L to the high level H while the carry signal CR having the high level H is output, a stage 200 may not output the initialization gate signal GI having the high level H.

FIGS. 4 to 17 illustrates operations of the first enable node controlling circuit 230, the first masking circuit 240, and the first gate output circuit 250 based on the first enable signal GI_EN in an embodiment. In such an embodiment, a second enable node controlling circuit 260, a second masking circuit 270 and a second gate output circuit 280 may have substantially the same configuration and operation as the first enable node controlling circuit 230, the first masking circuit 240 and the first gate output circuit 250. Thus, any repetitive detailed description of the operations of the second enable node controlling circuit 260, the second masking circuit 270 and the second gate output circuit 280 based on the second enable signal GC_EN is omitted.

Figure 18:
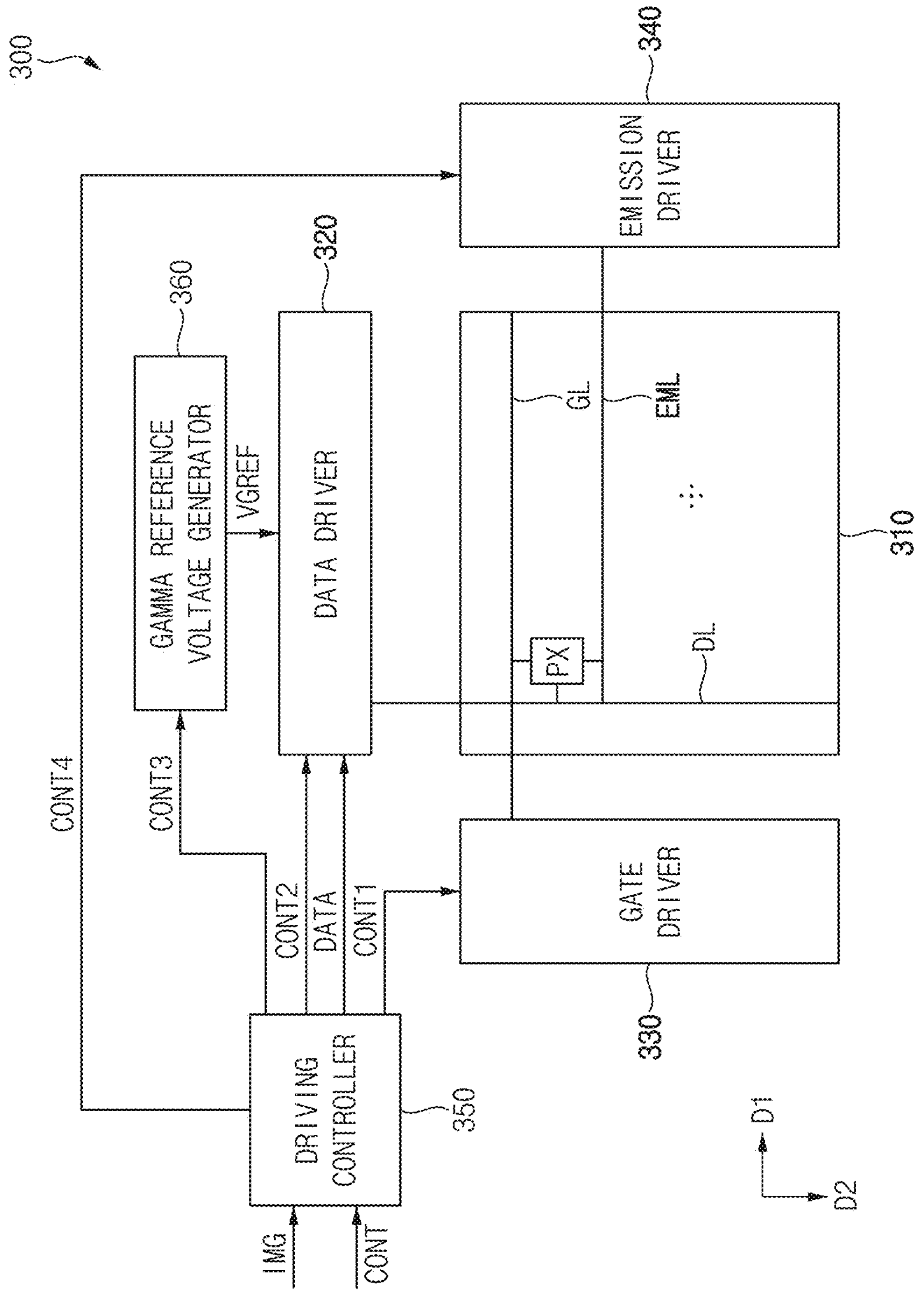
FIG. 18 is a block diagram illustrating a display device including a gate driver according to embodiments.
Figure 19:
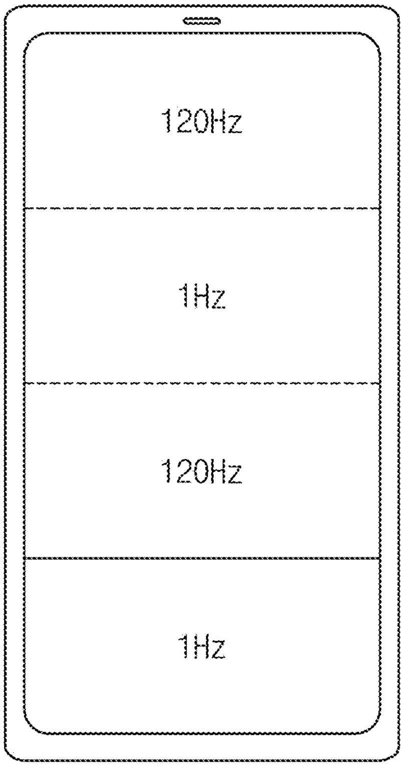
FIG. 19 is a block diagram illustrating a display panel on which multi-frequency driving is performed according to embodiments.

FIG. 18 is a block diagram illustrating a display device including a gate driver according to embodiments. FIG. 19 is a block diagram illustrating a display panel on which multi-frequency driving is performed according to embodiments.

Referring to FIGS. 18 and 19, an embodiment of a display device 300 may include a display panel 310 and a display panel driver. The display panel driver may include a driving controller 350, a gate driver 330, a gamma reference voltage generator 360, a data driver 320, and an emission driver 340.

In an embodiment, for example, the driving controller 350 and the data driver 320 may be integrally formed as a single unit (e.g., a single driver, integrated circuit or module). In an embodiment, for example, the driving controller 350, the gamma reference voltage generator 360, and the data driver 320 may be integrally formed as a single circuit. In an embodiment, for example, the driving controller 350, the gate driver 330, the gamma reference voltage generator 360, and the data driver 320 may be integrally formed as a single unit. In an embodiment, for example, the driving controller 350, the gate driver 330, the gamma reference voltage generator 360, the data driver 320, and the emission driver 340 may be integrally formed as a single unit. A driving module including at least the driving controller 350 and the data driver 320 which are integrally formed as a single unit may be referred to as a timing controller embedded data driver (TED).

The display panel 310 may include a display region for displaying an image and a peripheral region disposed adjacent to the display region.

In an embodiment, for example, the display panel 310 may be an organic light emitting diode display panel including organic light emitting diodes. In an embodiment, for example, the display panel 310 may be a quantum-dot organic light emitting diode display panel including organic light emitting diodes and quantum-dot color filters. In an embodiment, for example, the display panel 310 may be a quantum-dot nano light emitting diode display panel including nano light emitting diodes and quantum-dot color filters.

The display panel 310 may include gate lines GL, data lines DL, emission lines EML, and pixels PX electrically connected to the gate lines GL, the data lines DL, and the emission lines EML. The gate lines GL may extend in a first direction D1, and the data lines DL may extend in a second direction D2 crossing the first direction D1. The emission lines EML may extend in the first direction D1.

The driving controller 350 may receive input image data IMG and an input control signal CONT from an external device. In an embodiment, for example, the input image data IMG may include red image data, green image data, and blue image data. The input image data IMG may further include white image data. The input image data IMG may include magenta image data, yellow image data, and cyan image data. The input control signal CONT may include a master clock signal and a data enable signal. The input control signal CONT may further include a vertical synchronization signal and a horizontal synchronization signal.

The driving controller 350 may generate a first control signal CONT1, a second control signal CONT2, a third control signal CONT3, a fourth control signal CONT4, and a data signal DATA based on the input image data IMG and the input control signal CONT.

The driving controller 350 may generate the first control signal CONT1 for controlling an operation of the gate driver 330 based on the input control signal CONT, and output the first control signal CONT1 to the gate driver 330. The first control signal CONT1 may include a vertical start signal and a gate clock signal.

The driving controller 350 may generate the second control signal CONT2 for controlling an operation of the data driver 320 based on the input control signal CONT, and output the second control signal CONT2 to the data driver 320. The second control signal CONT2 may include a horizontal start signal and a load signal.

The driving controller 350 may generate the data signal DATA based on the input image data IMG. The driving controller 350 may output the data signal DATA to the data driver 320.

The driving controller 350 may generate the third control signal CONT3 for controlling an operation of the gamma reference voltage generator 360 based on the input control signal CONT, and output the third control signal CONT3 to the gamma reference voltage generator 360.

The driving controller 350 may generate the fourth control signal CONT4 for controlling an operation of the emission driver 340 based on the input control signal CONT, and output the fourth control signal CONT4 to the emission driver 340.

The gate driver 330 may generate gate signals for driving the gate lines GL in response to the first control signal CONT1 received from the driving controller 350. The gate driver 330 may output the gate signals to the gate lines GL.

In an embodiment, the gate driver 330 may be integrated on (or formed in) the peripheral region of the display panel 310.

The gamma reference voltage generator 360 may generate a gamma reference voltage VGREF in response to the third control signal CONT3 received from the driving controller 350. The gamma reference voltage generator 360 may provide the gamma reference voltage VGREF to the data driver 320. The gamma reference voltage VGREF may have a value corresponding to each data signal DATA.

In an embodiment, the gamma reference voltage generator 360 may be disposed in the driving controller 350 or the data driver 320.

The data driver 320 may receive the second control signal CONT2 and the data signal DATA from the driving controller 350 and receive the gamma reference voltage VGREF from the gamma reference voltage generator 360. The data driver 320 may convert the data signal DATA into a data voltage in analog form. The data driver 320 may output the data voltage to the data line DL.

The emission driver 340 may generate emission signals for driving the emission lines EML in response to the fourth control signal CONT4 received from the driving controller 350. The emission driver 340 may output the emission signals to the emission lines EML.

In an embodiment, the emission driver 340 may be integrated in the peripheral region of the display panel 310. In an embodiment, the emission driver 340 may be mounted on the peripheral portion of the display panel 310.

The display device 300 according to embodiments may perform multi-frequency driving (MFD) that drives a plurality of panel regions of the display panel 310 at a plurality of driving frequencies (that may be different from each other), respectively. The driving controller 350 may divide the input image data IMG into a plurality of panel region data for a plurality of panel regions each including at least one pixel row, and may determine whether each of the plurality of panel region data represents a still image. The driving controller 350 may decide a plurality of driving frequencies for the plurality of panel regions based on based on whether each of the plurality of panel region data represents the still image. In an embodiment, in a case where each panel region data represents a moving image, the driving controller 350 may decide the driving frequency for the panel region corresponding to the panel region data as a normal driving frequency. Here, the normal driving frequency may be a driving frequency in normal driving of the display device 300. In an embodiment, for example, the normal driving frequency may be the same as an input frame frequency of the input image data IMG. Further, in a case where each panel region data represents the still image, the driving controller 350 may decide the driving frequency for the panel region corresponding to the panel region data as a low driving frequency lower than the normal driving frequency. Here, the low driving frequency may be any frequency lower than the normal driving frequency. In an embodiment, for example, as shown in FIG. 19, the normal driving frequency may be 120 hertz (Hz), and the low driving frequency may be 1 Hz.

Figure 20:
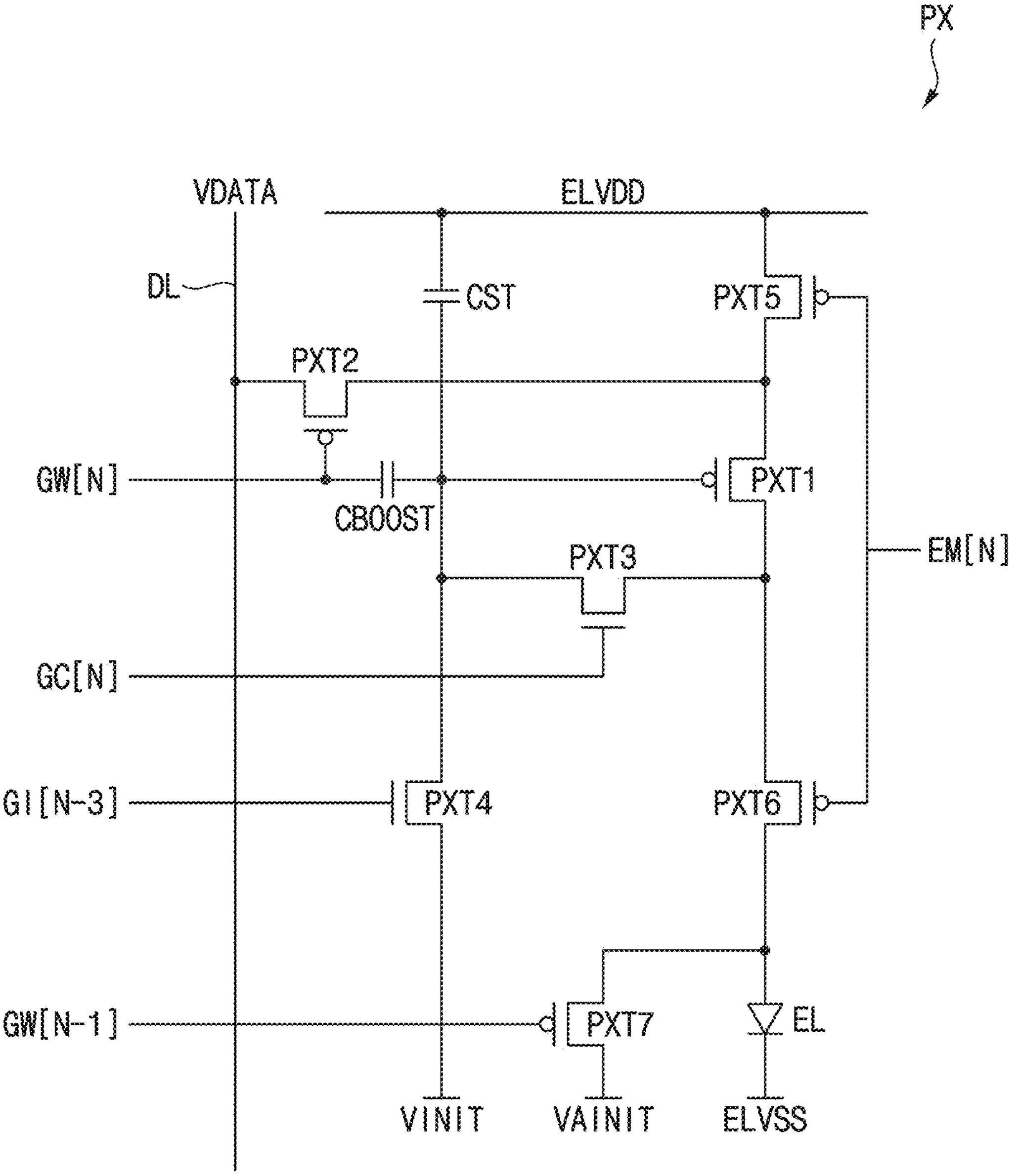
FIG. 20 is a circuit diagram illustrating an example of a pixel included in a display device according to embodiments.

FIG. 20 is a circuit diagram illustrating an example of a pixel included in a display device according to embodiments.

Referring to FIG. 20, an embodiment of the display panel 310 may include a plurality of pixels PX, and each of the pixels PX may include a light emitting element EL.

In an embodiment, the pixel PX may include a first type transistor and a second type transistor different from the first type transistor. In an embodiment, for example, the first type transistor may be a polysilicon thin film transistor. In an embodiment, for example, the first type transistor may be a low temperature polysilicon (LTPS) thin film transistor. In an embodiment, for example, the second type transistor may be an oxide thin film transistor. In an embodiment, for example, the first type transistor may be a P-type transistor, and the second type transistor may be an N-type transistor.

The pixel PX may include a driving transistor PXT1, a switching transistor PXT2, a compensating transistor PXT3, a gate initializing transistor PXT4, a first emission transistor PXT5, a second emission transistor PXT6, an anode initializing transistor PXT7, a storage capacitor CST and the light emitting element EL.

The driving transistor PXT1 may generate a driving current. The switching transistor PXT2 may transfer the data voltage VDATA to a first terminal of the driving transistor PXT1 in response to a writing gate signal GW[N]. The compensating transistor PXT3 may diode-connect the driving transistor PXT1 in response to a compensation signal GC[N]. The storage capacitor CST may store the data voltage VDATA transferred through the switching transistor PXT2 and the diode-connected driving transistor PXT1. The gate initializing transistor PXT4 may provide an initialization voltage VINIT to the storage capacitor CST and a gate of the driving transistor PXT1 in response to an initialization gate signal GI[N−3]. The first emission transistor PXT5 may connect a line of a first power supply voltage ELVDD to the first terminal of the driving transistor PXT1 in response to the emission signal EM[N]. The second emission transistor PXT6 may connect a second terminal of the driving transistor PXT1 to the light emitting element EL in response to the emission signal EM[N]. The anode initializing transistor PXT7 that provides an anode initialization voltage VINIT to the light emitting element EL in response to a previous writing gate signal GW[N−1]. The light emitting element EL may emit light based on the driving current from the line of the first power supply voltage ELVDD to a line of a second power supply voltage ELVSS.

In an embodiment, the pixel PX may further include a boost capacitor CBOOST coupled between a line of the writing gate signal GW[N] and the gate of the driving transistor PXT1.

In an embodiment, at least a portion of the transistors PXT1 through PXT7 of the pixel PX may be implemented with NMOS transistors, and the remaining portion of the transistors PXT1 through PXT7 of the pixel PX may be implemented with PMOS transistors. In an embodiment, for example, as illustrated in FIG. 20, the compensating transistor PXT3 and the gate initializing transistor PXT4 may be implemented with the NMOS transistors, and the remaining transistors PXT1, PXT2 and PXT5 through PXT7 may be implemented with the PMOS transistors. In other embodiments, all of the transistors PXT1 through PXT7 of the pixel PX may be implemented with the NMOS transistors, or may be implemented with the PMOS transistors.

Figure 21:
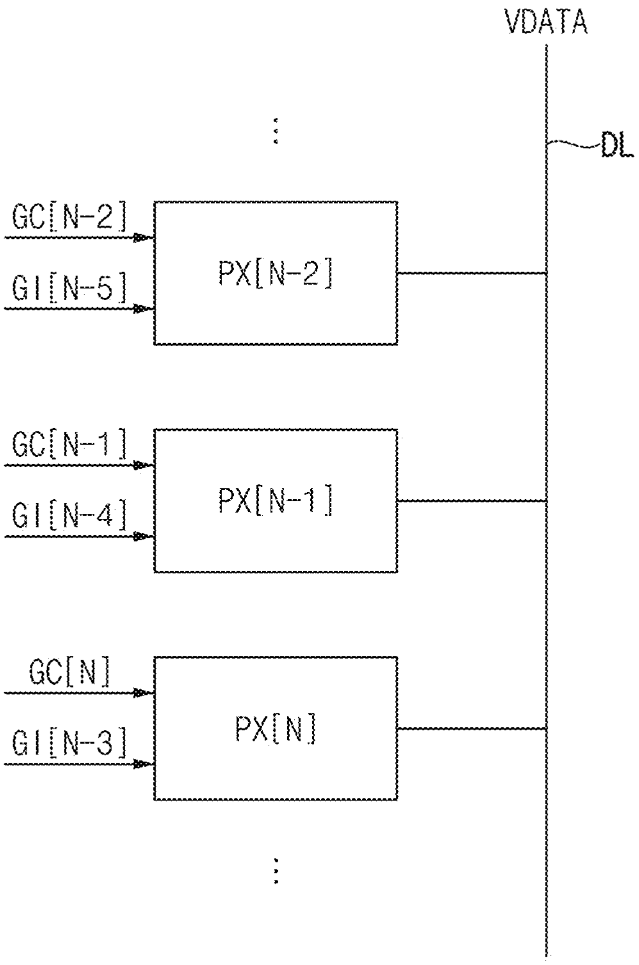
FIG. 21 is a block diagram illustrating an example of an operation in which an initialization gate signal and a compensation gate signal output from each stage included in a gate driver according to embodiments are applied to a pixel.

FIG. 21 is a block diagram illustrating an example of an operation in which an initialization gate signal and a compensation gate signal output from each stage included in a gate driver according to embodiments are applied to a pixel.

Referring to FIG. 21, an embodiment of the display panel 310 may include the pixels PX. In an embodiment, as shown in FIG. 21, the pixels PX may include an (N−2)-th pixel PX[N−2], an (N−1)-th pixel PX[N−1], and an N-th pixel PX[N] may be included.

In an embodiment, as described above, the output timings of the initialization gate signal GI and the compensation gate signal GC output from each stage 200 may be substantially the same as each other. An order of lines of the initialization gate signal GI coupled to the pixels PX and an order of lines of the compensation gate signal GC coupled to the pixels PX may be different from each other.

In an embodiment, for example, the (N−2)-th pixel PX[N−2] may receive an (N−2)-th compensation gate signal GC[N−2] and an (N−5)-th initialization gate signal GI[N−5]. The (N−1)-th pixel PX[N−1] may receive an (N−1)-th compensation gate signal GC[N−1] and an (N−4)-th initialization gate signal GI[N−4]. The N-th pixel PX[N] may receive an N-th compensation gate signal GC[N] and an (N−3)-th initialization gate signal GI[N−3].

When the order of the lines of the initialization gate signal GI coupled to the pixels PX and the order of the lines of the compensation gate signal GC coupled to the pixels PX are the same as each other (e.g., when the N-th compensation gate signal GC[N] and the N-th initialization gate signal GI[N] are applied to the N-th pixel PX[N]), the output timing of the initialization gate signal GI and the output timing of the compensation gate signal GC may be the same as each other. When the output timing of the initialization gate signal GI and the output timing of the compensation gate signal GC are the same as each other, a timing at which the data voltage VDATA is applied to the storage capacitor CST and a timing at which the storage capacitor CST is initialized with the initialization voltage VINIT may be the same as each other, the display device 300 may not operate normally. Therefore, in embodiments of the invention, the order of the lines of the initialization gate signal GI coupled to the pixels PX and the order of the lines of the compensation gate signal GC coupled to the pixels PX may be different from each other, so that an initialization is performed in the pixels PX. A timing at which the gate signal GI is applied to the pixels PX and a timing at which the compensation gate signal GC is applied to pixels PX may be different from each other.

In an embodiment, as described above, each stage 200 may include the first enable node controlling circuit 230 that controls the voltage of the first enable node GI_EN_NODE based on the first enable signal GI_EN, and holds the voltage of the first enable node GI_EN while the carry signal CR is output, and the first masking circuit 240 that selectively couples the second node QB and the third node GI_MQB in response to the voltage of the first enable node GI_EN_NODE. In such an embodiment, each stage 200 may include the second enable node controlling circuit 260 that controls the voltage of the second enable node GC_EN_NODE based on the second enable signal GC_EN, and holds the voltage of the second enable node GC_EN while the carry signal CR is output, and the second masking circuit 270 that selectively couples the second node QB and the fourth node GC_MQB in response to the voltage of the second enable node GC_EN_NODE. Accordingly, each of the initialization gate signals GI and the compensation gate signals GC generated by the gate driver 330 may have a time length corresponding to two or more horizontal times, and the initialization gate signals GI and the compensation gate signals GC may be provided at different driving frequencies to respective regions of the display panel 310. In such an embodiment, power consumption and area of the gate driver 330 may be reduced by sharing the control circuit 210.

Figure 22:
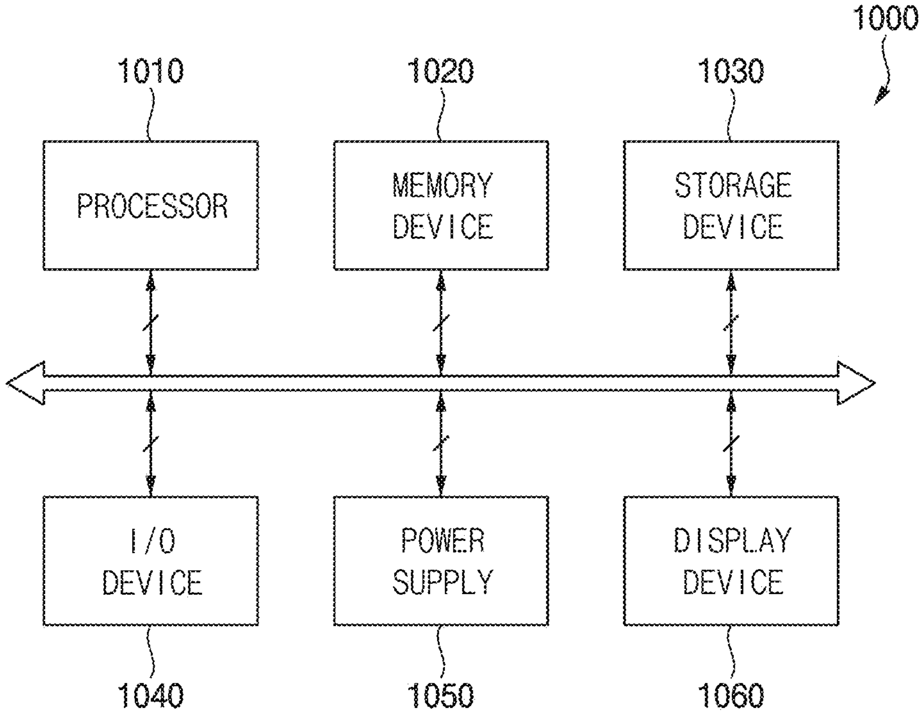
FIG. 22 is a block diagram illustrating an electronic device according to an embodiment.
Figure 23:
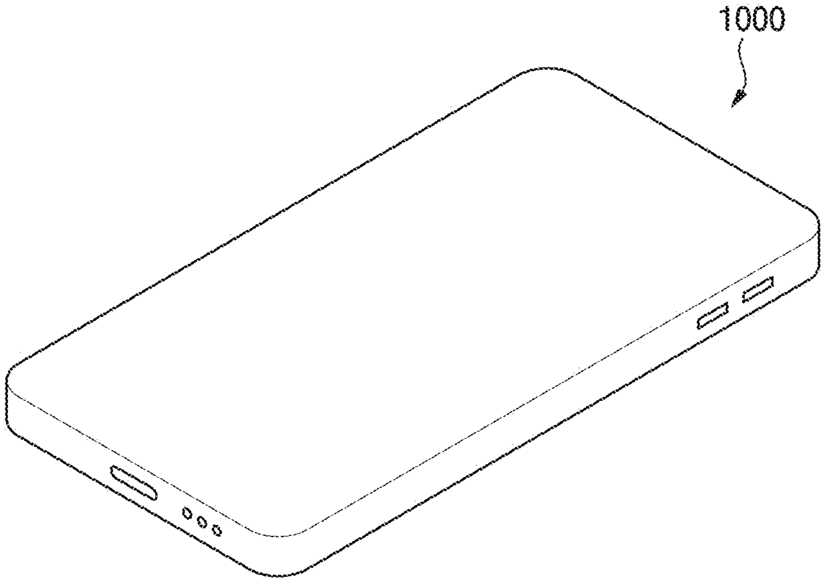
FIG. 23 is a diagram illustrating an embodiment in which the electronic device of FIG. 22 is implemented as a smart phone device.

FIG. 22 is a block diagram illustrating an electronic device according to an embodiment. FIG. 23 is a diagram illustrating an embodiment in which the electronic device of FIG. 22 is implemented as a smart phone device.

Referring to FIGS. 22 and 23, an embodiment of the electronic device 1000 may include a processor 1010, a memory device 1020, a storage device 1030, an input/output (I/O) device 1040, a power supply 1050, and a display device 1060. The display device 1060 may be the display device 10 of FIG. 18. In addition, the electronic device 1000 may further include a plurality of ports for communicating with a video card, a sound card, a memory card, a universal serial bus (USB) device, other electronic device, and the like.

In an embodiment, as illustrated in FIG. 23, the electronic device 1000 may be implemented as a smart phone. However, the electronic device 1000 is not limited thereto. In an embodiment, for example, the electronic device 1000 may be implemented as a cellular phone, a video phone, a smart pad, a smart watch, a tablet personal computer (PC), a car navigation system, a computer monitor, a laptop, a head mounted display (HMD) device, or the like.

The processor 1010 may perform various computing functions. The processor 1010 may be a micro processor, a central processing unit (CPU), an application processor (AP), or the like. The processor 1010 may be coupled to other components via an address bus, a control bus, a data bus, or the like. Further, the processor 1010 may be coupled to an extended bus such as a peripheral component interconnection (PCI) bus.

The memory device 1020 may store data for operations of the electronic device 1000. In an embodiment, for example, the memory device 1020 may include at least one non-volatile memory device such as an erasable programmable read-only memory (EPROM) device, an electrically erasable programmable read-only memory (EEPROM) device, a flash memory device, a phase change random access memory (PRAM) device, a resistance random access memory (RRAM) device, a nano floating gate memory (NFGM) device, a polymer random access memory (PoRAM) device, a magnetic random access memory (MRAM) device, a ferroelectric random access memory (FRAM) device, or the like and/or at least one volatile memory device such as a dynamic random access memory (DRAM) device, a static random access memory (SRAM) device, a mobile DRAM device, or the like.

The storage device 1030 may include a solid state drive (SSD) device, a hard disk drive (HDD) device, a CD-ROM device, or the like.

The I/O device 1040 may include an input device such as a keyboard, a keypad, a mouse device, a touch-pad, a touch-screen, and the like, and an output device such as a printer, a speaker, or the like. In some embodiments, the I/O device 1040 may include the display device 1060.

The power supply 1050 may provide power for operations of the electronic device 1000.

The display device 1060 may be connected to other components through buses or other communication links.

The inventions may be applied to any display device and any electronic device including the touch panel. For example, the inventions may be applied to a mobile phone, a smart phone, a tablet computer, a digital television (TV), a three-dimensional (3D) TV, a PC, a home appliance, a laptop computer, a personal digital assistant (PDA), a portable multimedia player (PMP), a digital camera, a music player, a portable game console, a navigation device, etc.

The invention should not be construed as being limited to the embodiments set forth herein. Rather, these embodiments are provided so that this disclosure will be thorough and complete and will fully convey the concept of the invention to those skilled in the art.

While the invention has been particularly shown and described with reference to embodiments thereof, it will be understood by those of ordinary skill in the art that various changes in form and details may be made therein without departing from the spirit or scope of the invention as defined by the following claims.

What is claimed is:

1. A gate driver including a plurality of stages, each of the plurality of stages comprising:

a control circuit which controls a voltage of a first node and a voltage of a second node in response to an input signal, a first clock signal, and a second clock signal;

a carry output circuit which outputs a carry signal in response to the voltage of the first node and the voltage of the second node;

a first enable node controlling circuit which controls a voltage of a first enable node in response to the carry signal, a first enable signal, and a first inverted enable signal;

a first masking circuit which controls a voltage of a third node in response to the voltage of the second node and the voltage of the first enable node;

a first gate output circuit which outputs an initialization gate signal in response to the voltage of the first node and the voltage of the third node;

a second enable node controlling circuit which controls a voltage of a second enable node in response to the carry signal, a second enable signal, and a second inverted enable signal;

a second masking circuit which controls a voltage of a fourth node in response to the voltage of the second node and the voltage of the second enable node; and a second gate output circuit which outputs a compensation gate signal in response to the voltage of the first node and the voltage of the fourth node.

2. The gate driver of claim 1, wherein, in a case where the first enable signal has a first level before the carry signal having the first level is output, the first enable node controlling circuit controls the voltage of the first enable node to have a second level, wherein, while the carry signal having the first level is output, the first masking circuit controls the voltage of the third node to have the second level in response to the voltage of the first enable node having the second level, and the first gate output circuit outputs the initialization gate signal having the first level in response to the voltage of the third node having the second level, wherein, in a case where the second enable signal has the first level before the carry signal having the first level is output, the second enable node controlling circuit controls the voltage of the second enable node to have the second level, and wherein, while the carry signal having the first level is output, the second masking circuit controls the voltage of the fourth node to have the second level in response to the voltage of the second enable node having the second level, and the second gate output circuit outputs the compensation gate signal having the first level in response to the voltage of the fourth node having the second level.

3. The gate driver of claim 2, wherein, in a case where a level of the first enable signal is changed from the first level to the second level while the carry signal having the first level is output, the first enable node controlling circuit holds the voltage of the first enable node as the second level until outputting the carry signal having the first level is completed, and wherein, in a case where a level of the second enable signal is changed from the first level to the second level while the carry signal having the first level is output, the second enable node controlling circuit holds the voltage of the second enable node as the second level until outputting the carry signal having the first level is completed.

4. The gate driver of claim 1, wherein, in a case where the first enable signal has a second level before the carry signal having a first level is output, the first enable node controlling circuit controls the voltage of the first enable node to have the first level, wherein, while the carry signal having the first level is output, the first masking circuit controls the voltage of the third node to have the first level in response to the voltage of the first enable node having the first level, and the first gate output circuit does not output the initialization gate signal having the first level in response to the voltage of the third node having the first level, wherein, in a case where the second enable signal has the second level before the carry signal having the first level is output, the second enable node controlling circuit controls the voltage of the second enable node to have the first level, and wherein, while the carry signal having the first level is output, the second masking circuit controls the voltage of the fourth node to have the first level in response to the voltage of the second enable node having the first level, and the second gate output circuit does not output the compensation gate signal having the first level in response to the voltage of the fourth node having the first level.

5. The gate driver of claim 4, wherein, in a case where a level of the first enable signal is changed from the second level to the first level while the carry signal having the first level is output, the first enable node controlling circuit holds the voltage of the first enable node as the first level until outputting the carry signal having the first level is completed, and wherein, in a case where a level of the second enable signal is changed from the second level to the first level while the carry signal having the first level is output, the second enable node controlling circuit holds the voltage of the second enable node as the first level until outputting the carry signal having the first level is completed.

6. The gate driver of claim 1, wherein, while the carry signal having a first level is output, the first enable node controlling circuit holds the voltage of the first enable node as a previous level, and wherein, while the carry signal having the first level is output, the second enable node controlling circuit holds the voltage of the second enable node as a previous level.

7. The gate driver of claim 1, wherein, when the carry signal having a first level is not output, when the first enable signal has the first level, and when the first inverted enable signal has a second level, the first enable node controlling circuit controls the voltage of the first enable node to have the second level, wherein, when the carry signal having the first level is not output, when the first enable signal has the second level, and when the first inverted enable signal has the first level, the first enable node controlling circuit controls the voltage of the first enable node to have the first level, wherein, when the carry signal having the first level is not output, when the second enable signal has the first level, and when the second inverted enable signal has the second level, the second enable node controlling circuit controls the voltage of the second enable node to have the second level, and wherein, when the carry signal having the first level is not output, when the second enable signal has the second level, and when the second inverted enable signal has the first level, the second enable node controlling circuit controls the voltage of the second enable node to have the first level.

8. The gate driver of claim 1, wherein the first enable node controlling circuit includes:

fourteenth and fifteenth transistors coupled to each other in series between a high gate voltage line and the first enable node, wherein the fourteenth transistor is turned on in response to the carry signal, and the fifteenth transistor is turned on in response to the first enable signal; and sixteenth and seventeenth transistors coupled to each other in series between the first enable node and a low gate voltage line, where the sixteenth transistor is turned on in response to the first inverted enable signal, and the seventeenth transistor is turned on in response to the carry signal, and wherein the second enable node controlling circuit includes:

twenty-third and twenty-fourth transistors coupled to each other in series between the high gate voltage line and the second enable node, wherein the twenty-third transistor is turned on in response to the carry signal, and the twenty-fourth transistor is turned on in response to the second enable signal; and twenty-fifth and twenty-sixth transistors coupled to each other in series between the second enable node and the low gate voltage line, wherein the twenty-fifth transistor is turned on in response to the second inverted enable signal, and the twenty-sixth transistor is turned on in response to the carry signal.

9. The gate driver of claim 8, wherein the fourteenth transistor includes a gate which receives the carry signal, a first terminal coupled to the high gate voltage line, and a second terminal, wherein the fifteenth transistor includes a gate which receives the first enable signal, a first terminal coupled to the second terminal of the fourteenth transistor, and a second terminal coupled to the first enable node, wherein the sixteenth transistor includes a gate which receives the first inverted enable signal, a first terminal coupled to the first enable node, and a second terminal, wherein the seventeenth transistor includes a gate which receives the carry signal, a first terminal coupled to the second terminal of the sixteenth transistor, and a second terminal coupled to the low gate voltage line, wherein the twenty-third transistor includes a gate which receives the carry signal, a first terminal coupled to the high gate voltage line, and a second terminal, wherein the twenty-fourth transistor includes a gate which receives the second enable signal, a first terminal coupled to the second terminal of the twenty-third transistor, and a second terminal coupled to the second enable node, wherein the twenty-fifth transistor includes a gate which receives the second inverted enable signal, a first terminal coupled to the second enable node, and a second terminal, and wherein the twenty-sixth transistor includes a gate which receives the carry signal, a first terminal coupled to the second terminal of the twenty-fifth transistor, and a second terminal coupled to the low gate voltage line.

10. The gate driver of claim 8, wherein the first enable node controlling circuit further includes:

a fifth capacitor coupled between the first enable node and the low gate voltage line, and wherein the second enable node controlling circuit further includes:

a seventh capacitor coupled between the second enable node and the low gate voltage line.

11. The gate driver of claim 1, wherein the first masking circuit disconnects the second node from the third node when the voltage of the first enable node has a first level, and couples the second node to the third node when the voltage of the first enable node has a second level, and wherein the second masking circuit disconnects the second node from the fourth node when the voltage of the second enable node has the first level, and couples the second node to the fourth node when the voltage of the second enable node has the second level.

12. The gate driver of claim 1, wherein the first masking circuit includes:

an eighteenth transistor which selectively couples the second node to the third node in response to the voltage of the first enable node, and wherein the second masking circuit includes:

a twenty-seventh transistor which selectively couples the second node to the fourth node in response to the voltage of the second enable node.

13. The gate driver of claim 12, wherein the eighteenth transistor includes a gate coupled to the first enable node, a first terminal coupled to the second node, and a second terminal coupled to the third node, and wherein the twenty-seventh transistor includes a gate coupled to the second enable node, a first terminal coupled to the second node, and a second terminal coupled to the fourth node.

14. The gate driver of claim 12, wherein the first masking circuit further includes:

a sixth capacitor coupled between a high gate voltage line and the third node; and nineteenth and twentieth transistors coupled to each other in series between the high gate voltage line and the third node, wherein the nineteenth transistor is turned on in response to the carry signal, and the twentieth transistor is turned on in response to the first enable signal, and wherein the second masking circuit further includes:

an eighth capacitor coupled between the high gate voltage line and the fourth node; and twenty-eighth and twenty-ninth transistors coupled to each other in series between the high gate voltage line and the fourth node, wherein the twenty-eighth transistor is turned on in response to the carry signal, and the twenty-ninth transistor being turned on in response to the second enable signal.

15. The gate driver of claim 14, wherein the nineteenth transistor includes a gate which receives the carry signal, a first terminal coupled to the high gate voltage line, and a second terminal, wherein the twentieth transistor includes a gate which receives the first enable signal, a first terminal coupled to the second terminal of the nineteenth transistor, and a second terminal coupled to the third node, wherein the twenty-eighth transistor includes a gate which receives the carry signal, a first terminal coupled to the high gate voltage line, and a second terminal, and wherein the twenty-ninth transistor includes a gate which receives the second enable signal, a first terminal coupled to the second terminal of the twenty-eighth transistor, and a second terminal coupled to the fourth node.

16. The gate driver of claim 1, wherein the carry output circuit includes:

a twelfth transistor including a gate coupled to the second node, a first terminal coupled to a high gate voltage line, and a second terminal coupled to a carry output node; and a thirteenth transistor including a gate coupled to the first node, a first terminal coupled to the carry output node, and a second terminal coupled to a low gate voltage line.

17. The gate driver of claim 1, wherein the first gate output circuit includes:

a twenty-first transistor including a gate coupled to the third node, a first terminal coupled to a high gate voltage line, and a second terminal coupled to a first gate output node; and a twenty-second transistor including a gate coupled to the first node, a first terminal coupled to the first gate output node, and a second terminal coupled to a low gate voltage line, and wherein the second gate output circuit includes:

a thirtieth transistor including a gate coupled to the fourth node, a first terminal coupled to the high gate voltage line, and a second terminal coupled to a second gate output node; and a thirty-first transistor including a gate coupled to the first node, a first terminal coupled to the second gate output node, and a second terminal coupled to the low gate voltage line.

18. A display device comprising:

a display panel including a pixel;

a data driver which provides a data voltage to the pixel;

a gate driver which provides an initialization gate signal and a compensation gate signal to the pixel; and a driving controller which controls the data driver and the gate driver, wherein the gate driver includes a plurality of stages, and each of the stages comprises:

a control circuit which controls a voltage of a first node and a voltage of a second node in response to an input signal, a first clock signal, and a second clock signal;

a carry output circuit which outputs a carry signal in response to the voltage of the first node and the voltage of the second node;

a first masking controlling circuit which controls a voltage of a first enable node in response to the carry signal, a first enable signal, and a first inverted enable signal, controls a voltage of a third node in response to the voltage of the second node and the voltage of the first enable node, and outputs an initialization gate signal in response to the voltage of the first node and the voltage of the third node; and a second masking controlling circuit which controls a voltage of a second enable node in response to the carry signal, a second enable signal, and a second inverted enable signal, controls a voltage of a fourth node in response to the voltage of the second node and the voltage of the second enable node, and outputs a compensation gate signal in response to the voltage of the first node and the voltage of the fourth node.

19. The display device of claim 18, wherein, in a case where the first enable signal has a first level before the carry signal having the first level is output, the first masking controlling circuit controls the voltage of the first enable node to a second level, wherein, while the carry signal having the first level is output, the first masking controlling circuit controls the voltage of the third node to have the second level in response to the voltage of the first enable node having the second level, and the first masking controlling circuit outputs the initialization gate signal having the first level in response to the voltage of the third node having the second level, wherein, in a case where the second enable signal has the first level before the carry signal having the first level is output, the second masking controlling circuit controls the voltage of the second enable node to have the second level, and wherein, while the carry signal having the first level is output, the second masking controlling circuit controls the voltage of the fourth node to have the second level in response to the voltage of the second enable node having the second level, and the second masking controlling circuit outputs the compensation gate signal having the first level in response to the voltage of the fourth node having the second level.

20. The display device of claim 19, wherein, in a case where a level of the first enable signal is changed from the first level to the second level while the carry signal having the first level is output, the first masking controlling circuit holds the voltage of the first enable node as the second level until outputting the carry signal having the first level is completed, and wherein, in a case where a level of the second enable signal is changed from the first level to the second level while the carry signal having the first level is output, the second masking controlling circuit holds the voltage of the second enable node as the second level until outputting the carry signal having the first level is completed.

* * * * *